(12) United States Patent
Lee et al.

(10) Patent No.: US 10,181,203 B2
(45) Date of Patent: Jan. 15, 2019

(54) METHOD FOR PROCESSING IMAGE DATA AND APPARATUS FOR THE SAME

(71) Applicant: Samsung Electronics Co., Ltd., Suwon-si, Gyeonggi-do (KR)

(72) Inventors: Woo-Yong Lee, Hwaseong-si (KR); Kwang-Kyu Park, Suwon-si (KR); Gyu-Bong Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 55 days.

(21) Appl. No.: 14/591,408

(22) Filed: Jan. 7, 2015

(65) Prior Publication Data

US 2015/0235366 A1 Aug. 20, 2015

(30) Foreign Application Priority Data

Feb. 21, 2014 (KR) .................. 10-2014-0020927

(51) Int. Cl.
| | | |
|---|---|---|
| *G06K 9/00* | (2006.01) | |
| *G06T 9/00* | (2006.01) | |
| *G06T 5/00* | (2006.01) | |
| *G06T 3/40* | (2006.01) | |
| *H04N 19/85* | (2014.01) | |
| *H04N 5/232* | (2006.01) | |

(52) U.S. Cl.
CPC .................. *G06T 9/00* (2013.01); *G06T 3/40* (2013.01); *G06T 5/00* (2013.01); *H04N 5/23229* (2013.01); *H04N 5/23293* (2013.01); *H04N 19/85* (2014.11); *H04N 5/23222* (2013.01)

(58) Field of Classification Search
None
See application file for complete search history.

(56) References Cited

U.S. PATENT DOCUMENTS

| | | | | |
|---|---|---|---|---|
| 6,608,633 B1 * | 8/2003 | Sciammarella | ........ | H04N 5/445 348/E5.099 |
| 6,851,090 B1 * | 2/2005 | Gutta | ..................... | H04N 7/163 348/E7.061 |
| 8,379,130 B2 * | 2/2013 | Forutanpour | ........ | G11B 27/034 348/333.01 |
| 9,529,421 B2 * | 12/2016 | Kim | ......................... | G06F 3/005 |
| 2003/0223622 A1 | 12/2003 | Simon et al. | | |

(Continued)

FOREIGN PATENT DOCUMENTS

| | | |
|---|---|---|
| CN | 1475969 A | 2/2004 |
| CN | 102891960 A | 1/2013 |

(Continued)

OTHER PUBLICATIONS

JP 2007158868; machine English translation ; Tomita et al. App date : Dec. 7, 2005.*

(Continued)

*Primary Examiner* — Nancy Bitar
(74) *Attorney, Agent, or Firm* — Jefferson IP Law, LLP

(57) ABSTRACT

An image processing method that processes an image photographed by an electronic device is provided. The method includes obtaining a plurality of original images from the image photographed, analyzing the plurality of original images, and providing information for recommending an image processing mode based on at least a part of an analyzed result.

20 Claims, 18 Drawing Sheets

(56) References Cited

U.S. PATENT DOCUMENTS

| | | | |
|---|---|---|---|
| 2004/0252203 A1* | 12/2004 | Kitajima | H04N 1/00132 348/222.1 |
| 2005/0060666 A1* | 3/2005 | Hoshino | G06F 3/04815 715/811 |
| 2006/0190595 A1* | 8/2006 | Kim | H04M 19/041 709/224 |
| 2007/0283392 A1* | 12/2007 | Tsusaka | G06F 17/30867 725/47 |
| 2008/0084398 A1* | 4/2008 | Ito | G06F 1/1626 345/173 |
| 2009/0322899 A1* | 12/2009 | Chan | H04N 5/232 348/222.1 |
| 2010/0245610 A1* | 9/2010 | Ahn | H04N 5/23219 348/222.1 |
| 2011/0032373 A1* | 2/2011 | Forutanpour | G11B 27/034 348/222.1 |
| 2011/0074971 A1* | 3/2011 | Kwon | H04N 5/232 348/222.1 |
| 2011/0199511 A1* | 8/2011 | Takahashi | H04N 1/00198 348/231.5 |
| 2011/0200980 A1* | 8/2011 | Takahashi | G06F 9/4446 434/365 |
| 2012/0162267 A1* | 6/2012 | Shimazu | G06F 3/04883 345/684 |
| 2013/0021477 A1 | 1/2013 | Kannermark et al. | |
| 2013/0061266 A1* | 3/2013 | Chai | H04N 5/44543 725/41 |
| 2013/0158531 A1 | 6/2013 | Goldshleger et al. | |
| 2013/0166698 A1* | 6/2013 | Georgis | H04L 67/104 709/219 |

FOREIGN PATENT DOCUMENTS

| | | |
|---|---|---|
| CN | 103413270 A | 11/2013 |
| CN | 103514593 A | 1/2014 |
| KR | 10-2013-0129529 A | 11/2013 |

OTHER PUBLICATIONS

Chinese Office Action dated Nov. 1, 2018, issued in Chinese Patent Application No. 201510087408. 1.

* cited by examiner

METHOD FOR PROCESSING IMAGE DATA AND APPARATUS FOR THE SAME

CROSS-REFERENCE TO RELATED APPLICATION(S)

This application claims the benefit under 35 U.S.C. § 119(a) of a Korean patent application filed on Feb. 21, 2014 in the Korean Intellectual Property Office and assigned Serial number 10-2014-0020927, the entire disclosure of which is hereby incorporated by reference.

TECHNICAL FIELD

The present disclosure relates to a pre-processing method and apparatus for composing obtained images.

BACKGROUND

Currently, user terminals, such as electronic devices (for example, a mobile device, a mobile phone, a smart phone, and a tablet Personal Computer (PC)) have at least one camera and provide a function of photographing an image such as a still picture or a moving picture by using the at least one camera.

Also, the electronic devices have an enhanced data processing operation capability and an enhanced media structural component (for example, a camera and the like), and simultaneously, provide various media processing functions.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for providing various media using an image photographed by an electronic device.

Another aspect of the present disclosure is to provide a method and apparatus for providing various media using an image photographed by an electronic device, and for recommending or providing a user with an optimum medium.

Another aspect of the present disclosure is to provide a method and apparatus for providing various media using an image photographed by an electronic device, and for promptly and efficiently providing an optimum medium.

In accordance with another aspect of the present disclosure, a method of processing an image photographed by an electronic device is provided. The method includes obtaining a plurality of original images from the image photographed, analyzing the plurality of original images, and providing information for recommending an image processing mode, based on at least a part of an analyzed result.

In accordance with another aspect of the present disclosure, an image processing apparatus is provided. The apparatus includes an image sensor unit configured to generate and to provide an original image, a controller configured to analyze a plurality of original images, and to provide information for recommending an image processing mode based on at least a part of an analyzed result, and a memory unit configured to store at least one of the plurality of original images and encoding data obtained by encoding the plurality of original images.

In accordance with another aspect of the present disclosure, a storage medium storing instructions is provided. The instructions are set to instruct at least one processor to execute a method of processing an image photographed by an electronic device, the method includes analyzing a plurality of original images obtained from the image photographed, and providing information for recommending an image processing mode, based on at least a part of an analyzed result.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
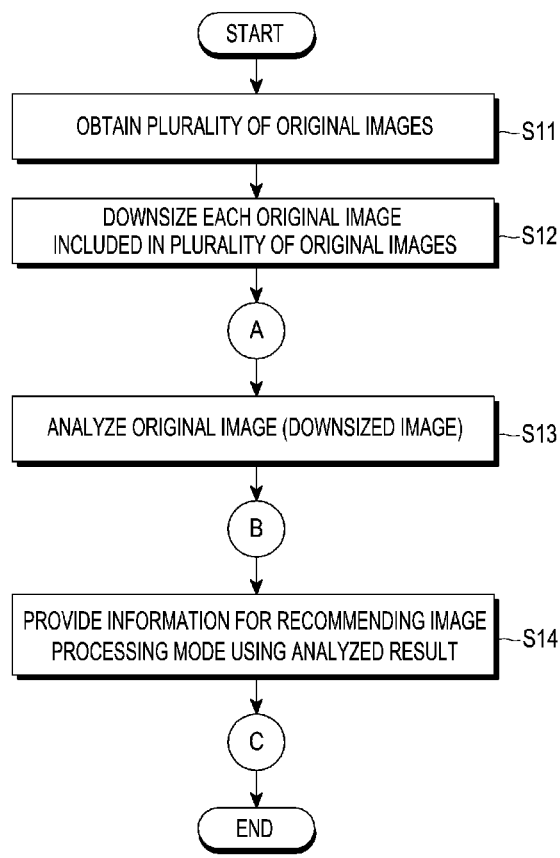
FIG. 1 is a flowchart illustrating an image processing method according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to at least one of such surface.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

Although the expressions such as "first" and "second" in the present disclosure may modify various constituent elements of the present disclosure, they do not limit the constituent elements. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific embodiments, and are not intended to limit the present disclosure. Singular forms are intended to include plural forms unless the context clearly indicates otherwise.

Hereinafter, an electronic sensor according to various embodiments of the present disclosure will be described with reference to the accompanying drawings. A camera module including the electronic sensor according to the embodiments of the present disclosure, for example, an image sensor may be mounted to an electronic device. Such an electronic device may be provided with a camera, a camcorder, a web camera, a surveillance camera, a medical camera, a high speed camera, a multi-camera such as a 3D camera, and the like.

The electronic device according to various embodiments of the present disclosure may include a device having a communication function. For example, the electronic device may include a combination of at least one of various devices such as a smart phone, a tablet Personal Computer (PC), a mobile phone, a video phone, an e-book reader, a desktop PC, a laptop PC, a net-book computer, a Personal Digital Assistant (PDA), a Portable Multimedia Player (PMP), an MP3 player, a mobile medical device, a wearable device (e.g., a Head-Mounted-Device (HMD) such as electronic glasses, electronic clothing, an electronic clock, a wrist watch, an electronic bracelet, an electronic necklace, an electronic appcessory (i.e., application accessory), and a smart watch), a home appliance (e.g., a refrigerator, an air-conditioner, a vacuum cleaner, an oven, a microwave oven, a washing machine, an air cleaner, and the like), an artificial intelligence robot, a TeleVision (TV), a Digital Video Disk (DVD) player, an audio, various medical devices (e.g., a Magnetic Resonance Angiography (MRA), a Magnetic Resonance Imaging (MRI), a Computed Tomography (CT), a movie camera, an ultra sonic device, and the like), a navigation device, a Global Positioning System (GPS) receiver, an Event Data Recorder (EDR), a Flight Data Recorder (FDR), a set-top box, a TV box (e.g., a Samsung HomeSync™, an Apple TV™, or a Google TV™), an electronic dictionary, a vehicle infotainment device, electronic equipment for a ship (e.g., navigation equipment for a ship, a gyrocompass, and the like), an avionics, security equipment, electronic clothing, an electronic key, a camcorder, a game consoles, a flat panel display device, an electronic picture frame, an electronic album, furniture or a part of a building/structure including a communication function, an electronic board, an electronic signature receiving device, a projector, and the like. Further, it is obvious to those skilled in the art that electronic devices according to various embodiments of the present disclosure are not limited to the above-described devices.

Hereinafter, the term "original image" in various embodiments of the present disclosure is used for distinguishing image data from encoding data, and indicates image data that is not compressed or encoded. Also, "original image" in various embodiments of the present disclosure may include an RAW format image, a YUV format image, an RGB format image, and the like. The "original image" in various embodiments of the present disclosure may include an image to which a process is executed, such as gamma correction, color filter arrangement interpolation, color matrix, color correction, color improvement, and the like.

FIG. 1 is a flowchart illustrating an image processing method according to an embodiment of the present disclosure.

Figure 2:
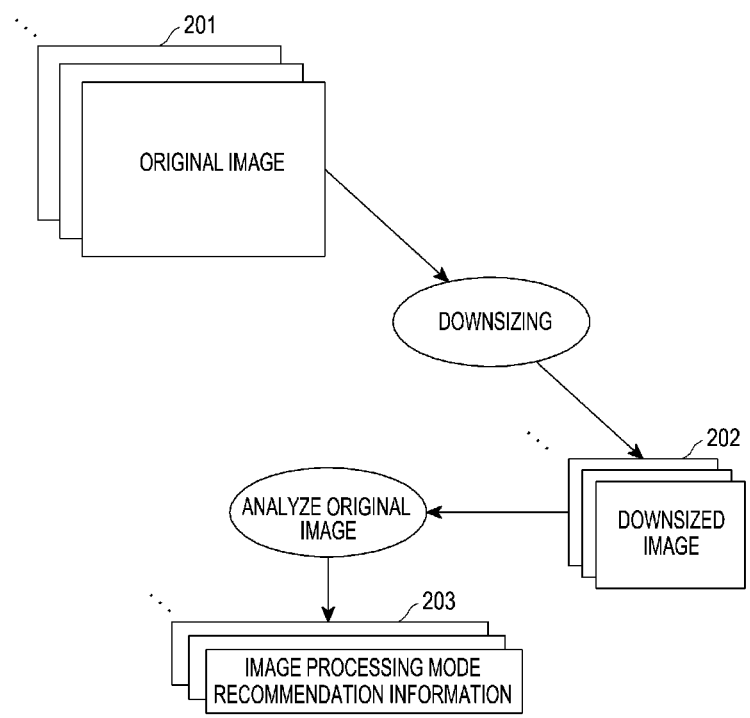
FIG. 2 is a block diagram illustrating an image processing method according to an embodiment of the present disclosure.

FIG. 2 is a block diagram illustrating an image processing method according to an embodiment of the present disclosure.

Figure 3:
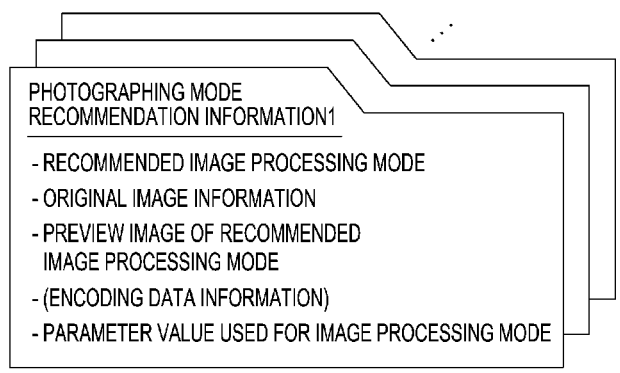
FIG. 3 illustrates an example of image processing mode recommendation information used in an image processing method according to an embodiment of the present disclosure.

FIG. 3 illustrates an example of image processing mode recommendation information used in an image processing method according to an embodiment of the present disclosure.

Referring to FIGS. 1, 2 and 3, an image processing method according to an embodiment of the present disclosure may include, operation S11 obtains a plurality of original images, operation S12 downsizes the original image, operation S13 analyzes the original images, and operation S14 provides information for recommending an image processing mode that uses at least one original image, based on an analyzed result.

In operation S11, obtain the plurality of original images may include an operation of receiving an original image 201 provided through an image sensor. The image sensor may provide the original image 201, based on a user input. For example, as a user input for photographing is generated (for example, an input on a photographing button, a touch input on a photographing button area, and the like), the original image 201 to be used for composing images of various image processing modes is input. The original images 201 may include a plurality of original images (for example, 30 pieces) which is input at time intervals (for example, ⅓₀ seconds), during a period of time (for example, a second) from a point in time when a user input is provided (for example, an input on a photographing button, a touch input on a photographing button area, and the like).

In operation S13, the analyzing of the original image determines the original image and analyzes information required for recommending an image processing mode. For example, the information determined in operation S13 may include at least one parameter value (hereinafter, referred to as an 'analyzed parameter value') from among a face region, a facial expression, a size of a mobile object, a location of the mobile object, a movement of the mobile object, information associated with whether objects included in a plurality of original images overlap, and a correlation of the plurality of original images.

In operation S14, the providing of the information for recommending the image processing mode recommends, based on the information determined in operation S13, at least one image processing mode from among a plurality of image processing modes provided in the electronic device. For example, operation S14 applies a parameter value detected with respect to each of the plurality of original images, to an image processing mode supported in the electronic device. Also, a degree of completeness for the image processing mode is determined. A recommended image processing mode may be determined based on the degree of completeness. For example, an image processing mode which has a degree of completeness higher than a threshold value may be determined to be the recommended image processing mode, or a number of image processing modes having a relatively high degree of completeness (for example, three image processing modes) may be determined to be the recommended image processing mode. For example, the image processing mode may include a best image mode, a best face mode, a drama image processing mode, a motion image processing mode, and the like.

In operation S14, the obtained information, for example, image processing mode recommendation information 203 may be provided. The image processing mode recommendation information may include at least one of the recommended image processing mode determined in operations S13 and S14, information associated with an original image used in the recommended image processing mode, a preview image corresponding to the recommended image processing mode, and a parameter value used for selecting the recommended image processing mode (please refer to FIG. 3).

The image processing mode recommendation information provided in operation S14 may be stored in association with a stored image (for example, encoding data), and may be variously applied to various applications executed in the electronic device.

As described above, operation S13 detects an analyzed parameter value with respect to each input original image, and operation S14 applies each analyzed parameter value to an image processing mode supported in the electronic device so as to determine a recommended image processing mode. During operations S13 and S14, a large amount of resources and time is expended for image processing leading to the fear that processing speed of the electronic device will be slowed, battery consumption will increase, and/or a large amount of time will be expended to provide the recommended image processing mode information.

To smoothly process operations S13 and S14, operations S13 and S14 are processed by downsizing the original image 201 and using the downsized image 202. The image processing method according to an embodiment of the present disclosure may further include operation S12 of downsizing the original image 201, which is executed before operations S13 and S14 are processed. Operation S12 of downsizing the original image 201 may use an operation processed for the display of a preview image. The size of the downsized original image 201 may include a size required for outputting a preview image.

Accordingly, operation S13 analyzes the downsized image 202 obtained through operation S12. In operation S14, determine and output image processing mode recommendation information based on information obtained in operation S13 with respect to the downsized image 202.

As described above, the electronic device downsizes the original image 201 using the operation processed for the display of a preview image, executes image analysis using the downsized image 202, and provides recommended image processing mode information, so that resources used for image processing may be efficiently used and recommended image processing mode information may be promptly provided.

Figure 4:
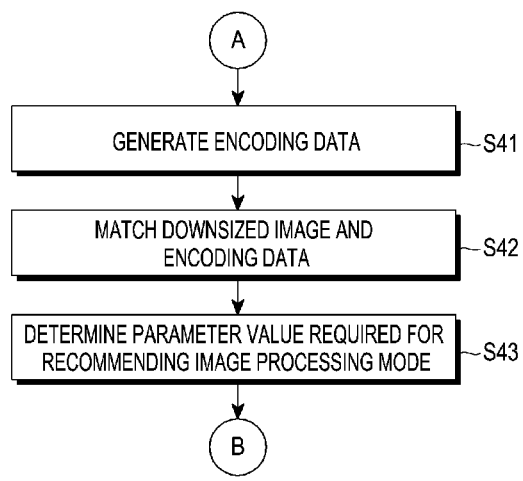
FIG. 4 is a flowchart illustrating a process included in an image processing method according to another embodiment of the present disclosure.

FIG. 4 is a flowchart illustrating a process included in an image processing method according to another embodiment of the present disclosure.

Figure 5:
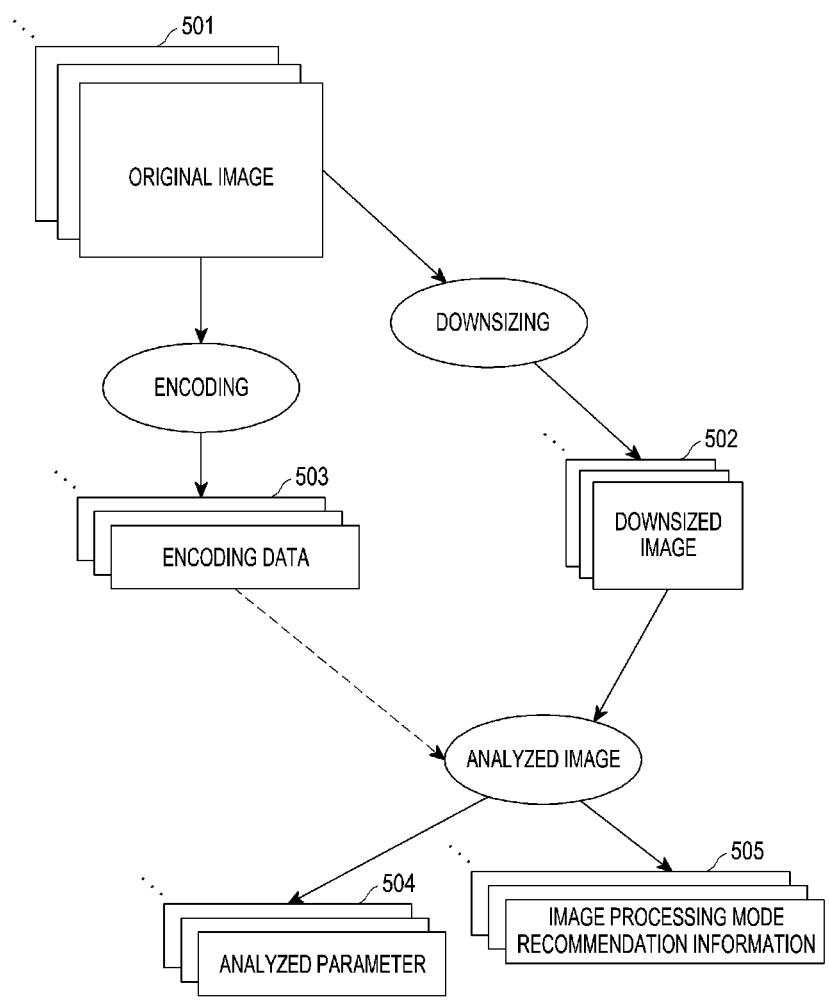
FIG. 5 is a block diagram illustrating an image processing method according to another embodiment of the present disclosure.

FIG. 5 is a block diagram illustrating an image processing method according to another embodiment of the present disclosure.

An image processing method according to another embodiment of the present disclosure may be configured to be similar to the image processing method according to an embodiment of the present disclosure, as shown in FIG. 1.

However, the image processing method according to another embodiment of the present disclosure may be configured to have somewhat different details in an operation of analyzing an original image, from the image processing method according to an embodiment of the present disclosure. For example, the image processing method according to another embodiment of the present disclosure may include operations S11, S12, and S14 which are included in the image processing method according to an embodiment of the present disclosure as shown in FIG. 1. The image processing method according to another embodiment of the present disclosure may include operation S41 of generating encoding data shown in FIG. 3, operation S42 of matching an original image and the encoding data, and operation S43 of determining a parameter value used for recommending an image processing mode, as an alternative to operation S13 included in the image processing method according to an embodiment of the present disclosure as shown in FIG. 1.

Referring to FIGS. 1, 4, and 5, an image processing method according to another embodiment of the present disclosure will be described in detail.

In operation S11, an operation of receiving an original image 501 provided through an image sensor may be included. In operation S12, downsizes the original image 501, and provides a downsized image 502.

In operation S41, execute an encoding process with respect to the original image 501, and outputs encoding data 503 through the process. Various encoding schemes (for example, JPEG and BMP) which are commonly used in the technical field of the present disclosure may be used for the encoding process.

The encoding data 503 may be used for a gallery application, an image editing application, and the like executed in the electronic device. Also, data to be generated through subsequent processes, for example, information required for recommending an image processing mode, and the like, may be used for a gallery application, an image editing application, and the like executed in the electronic device. In operation S42, an operation of matching the downsized image 502 and the encoding data 503 is processed. The operation of matching the downsized image 502 and the encoding data 503 may use a numbering scheme that assigns an identical identification number to the downsized image 502 and the encoding data 503, which correspond to one another, or a synchronous execution scheme.

In operation S43, determine information 504 (a parameter value and the like) required for recommending an image processing mode, using the downsized image 502. For example, the information determined in operation S43 may include information required for selecting (or recommending) at least one image processing mode from among various image processing modes, such as a best image mode, a best face mode, a drama image processing mode, a motion image processing mode, and the like, and particularly, may include at least one parameter value 504 from among a face region, a facial expression, information associated with whether or not eyes are closed, a size of a mobile object, a location of the mobile object, a movement of the mobile object, information associated with whether objects included in a plurality of original images overlap, and a correlation of the plurality of original images. Although an embodiment of the present disclosure describes the parameter value 504 as the information required for selecting (or recommending) an image processing mode, the present disclosure may not be limited thereto. For example, the information is sufficient when the information includes the information required for selecting (or recommending) an image processing mode, and may include, for example, various information provided from a movement sensor, a light sensor, and the like that may be used for selecting (or recommending) an image processing mode.

After operation S43, execute operation S14 providing information for recommending the image processing mode, as shown in FIG. 1.

In operation S14, process an operation of recommending at least one image processing mode from among a plurality of image processing modes provided by the electronic device, using the information determined in operation S43. For example, operation S14 applies a parameter value detected from each of the plurality of original images, to an image processing mode supported by the electronic device, for example, a best image mode, a best face mode, a drama image processing mode, a motion image processing mode, and the like. Also, a degree of completeness for the image processing mode is determined. A recommended image processing mode may be determined based on the degree of completeness. For example, an image processing mode which has a degree of completeness higher than a threshold value may be determined to be the recommended image processing mode, or a number of image processing modes having a relatively high degree of completeness (for example, three image processing modes) may be determined to be the recommended image processing mode.

In operation S14, information obtained while the operation is processed, for example, image processing mode recommendation information 505 may be provided. The image processing mode recommendation information may include at least one of the recommended image processing mode, original image information used for the recommended image processing mode (for example, an area where an original image is stored or an original image), a preview image corresponding to the recommended image processing mode, encoding data corresponding to the original image (for example, an encoding image and information indicating an area where the encoding image is stored), a parameter value used for selecting the recommended image processing mode, and the like (please refer to FIG. 3).

The image processing method according to another embodiment of the present disclosure may include an operation of encoding the original image 501, and matching the encoding data 503 and the downsized image 502. Through the above process, the image processing mode recommendation information 505 determined by analyzing the downsized image 502 may be provided in association with the encoding data 503 and thus, the image processing mode recommendation information 505 may be variously used in a gallery application, an image editing application, and the like executed in the electronic device. Also, data to be generated while subsequent operations are executed, for example, information required for recommending an image processing mode and the like, may be used in a gallery application, an image editing application, and the like executed in the electronic device and thus, an advantageous effect that effectively utilizes data generated in the image processing method may be provided.

Although the image processing method according to another embodiment of the present disclosure illustrates that operations S41 and S42 are processed before operation S43 or operation S14 is processed, the present disclosure may not limit a sequence of operations S41, S42, S43, and S14, and the sequence may be variously changed by those skilled in the technical field of the present disclosure. For example, operations S41 and S42 are sufficient when the original image 501 is encoded, and the encoding data 503 and the downsized image 502 are matched through the operations S41 and S42, and operations S41 and S42 may be executed in parallel with operation S43 or S14, or may be executed after operation S43 or S14. In addition, when operations S41 and S42 are executed after operation S14, the image processing mode recommendation information 505 generated in operation S14 may not include encoding data information. Also, operation S14 may delete an original image (for example, the downsized image 202) that is not used for the recommended image processing mode, excluding an original image (for example, the downsized image 202) that is used for the recommended image processing mode. When operations S41 and S42 are executed after operation S14, encoding may not be executed with respect to the original image (for example, the downsized image 202) that is not used for the recommended image processing mode.

Figure 6:
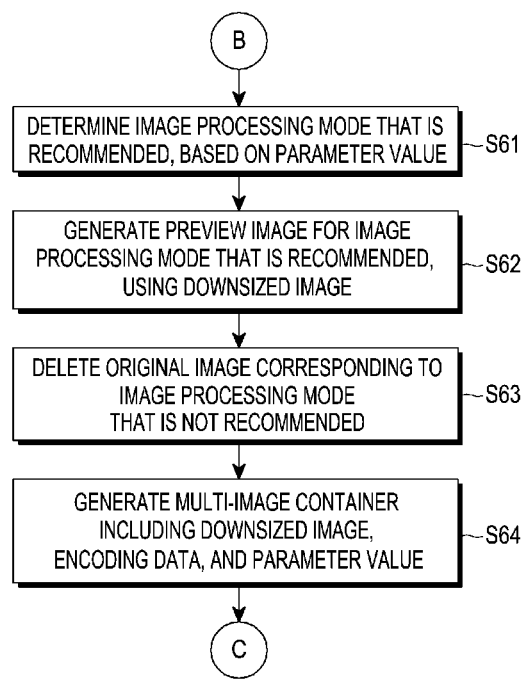
FIG. 6 is a flowchart illustrating a process included in an image processing method according to another embodiment of the present disclosure.

FIG. 6 is a flowchart illustrating a process included in an image processing method according to another embodiment of the present disclosure.

Figure 7:
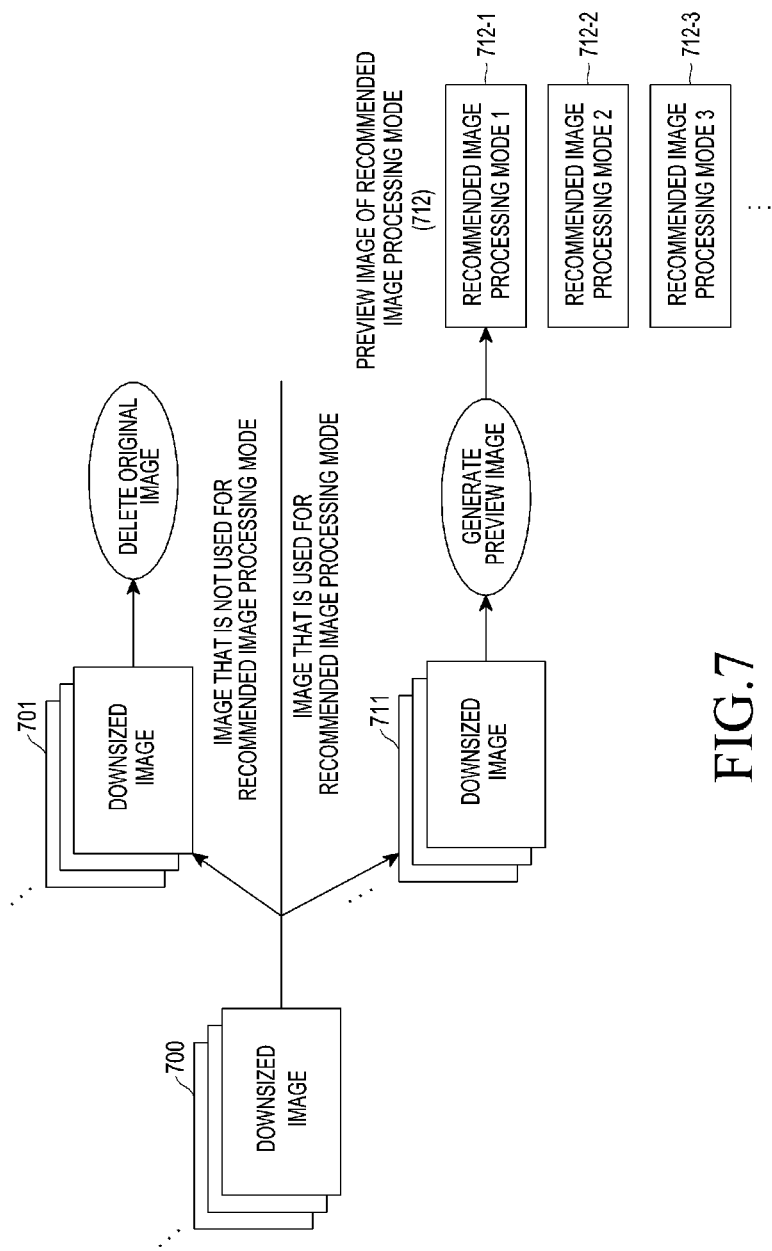
FIG. 7 is a block diagram illustrating an image processing method according to another embodiment of the present disclosure.

FIG. 7 is a block diagram illustrating an image processing method according to another embodiment of the present disclosure.

Figure 8:
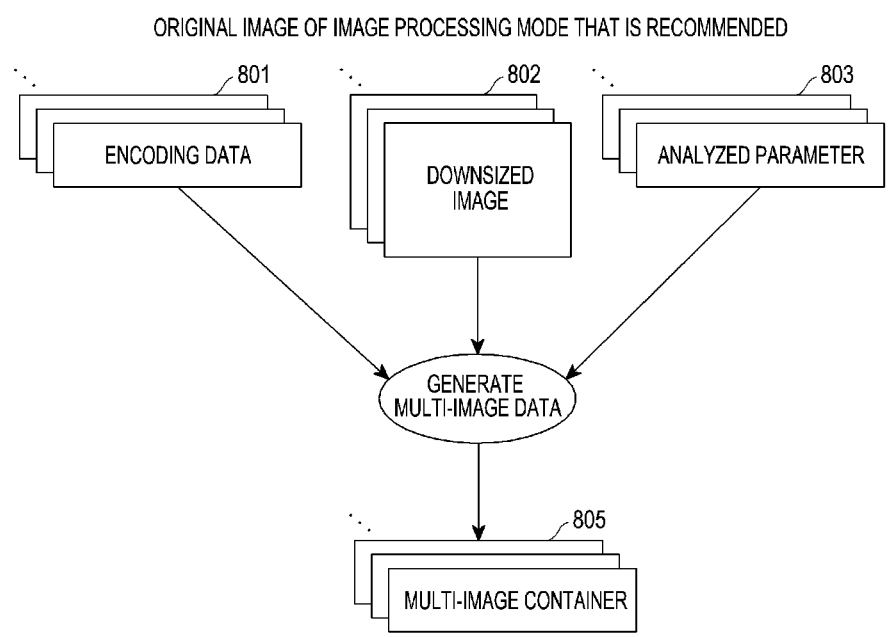
FIG. 8 is a block diagram illustrating an image processing method according to another embodiment of the present disclosure.

FIG. 8 is a block diagram illustrating an image processing method according to another embodiment of the present disclosure.

Referring to FIGS. 6, 7 and 8, the image processing method according to another embodiment of the present disclosure may be configured to be similar to the image processing method according to the various embodiments of the present disclosure as described earlier. However, the image processing method according to another embodiment of the present disclosure may be configured to have somewhat different details in an operation of providing image processing mode recommendation information, from the image processing method according to the various embodiments of the present disclosure as described earlier. For example, the image processing method according to another embodiment of the present disclosure may include operations S11, S12, and S13 included in the image processing method according to an embodiment of the present disclosure, and may include operations S61 through S64 illustrated in FIG. 6, as an alternative to operation S14. Alternatively, the image processing method according to another embodiment of the present disclosure may include operations S11, S12, S41, S42, and S43 included in the image processing method according to an embodiment of the present disclosure, and may include operations S61 through S64 illustrated in FIG. 6, as an alternative to operation S14.

In operation S61, determine a recommended image processing mode, based on information required for recommending an image processing mode, for example, at least one parameter value from among a face region, a facial expression, a size of a mobile object, a location of the mobile object, a movement of the mobile object, information associated with whether objects included in a plurality of original images overlap, and a correlation of the plurality of original images. For example, the information required for recommending the image processing mode (for example, the parameter value) may be applied to each image processing mode and thus, the degree of completeness for the image processing mode may be determined. The recommended image processing mode may be determined based on the degree of completeness. For example, an image processing mode which has a higher degree of completeness than a threshold value may be determined to be the recommended image processing mode, or a number of image processing modes having a relatively high degree of completeness (for example, three image processing modes) may be determined to be the recommended image processing mode.

Through operation S61, an image processing mode that is recommended and an image processing mode that is not recommended may be distinguished. Through the above, operation S62 detects, from downsized images 700, downsized images 711 that are used for an image processing mode that is recommended, and combine the downsized images 711 so as to generate and output a preview image 712 of the recommended image processing mode. For example, a series recommended processing modes 712-1, 712-2, and 712-3.

In operation S63, determine original images 701 that are not used for the recommended image processing mode, and delete the original images 701 that are not used for the recommended image processing mode. Through operation S63, images that are obtained from previous operations but have a low utilization since they are not used for the recommended processing mode, for example, an original image, a downsized image, or encoding data, may be removed. In one aspect, there is provided an advantageous effect that may prevent the use of resources for generating unnecessary data or the wasting of a storage for storing unnecessary data.

Although it is illustrated that operation S63 of the present disclosure is executed after operations S41 and S42 are executed, the present disclosure may be not limited thereto. For example, operation S63 may be executed before operations S41 and S42 are processed. In this example, operation S63 provides information indicating an original image (for example, the downsized image 701) which is deleted since it is not used for the recommended image processing mode, and operation S41 may use the same and may not execute encoding with respect to the original image that is not used for the recommended image processing mode.

In operation S64, generate a multi-image container 805 including data generated from the above operation. For example, a multi-image container may be generated by determining an original image 802 (for example, a downsized image) that is used for the recommended image processing mode which is determined in operation S63, encoding data 801 corresponding to the original image 802, and an analyzed parameter 803. The multi-image container may be provided to a gallery application, an image editing application, and the like executed in the electronic device, and may be effectively utilized in the gallery application, the image editing application, and the like.

As described above, the image processing method according to various embodiments of the present disclosure have been described. In particular, although it has been described that analysis is performed using a downsized image that is processed for the display of a preview image, a recommended image processing mode is determined based on an analyzed result, that is, an analyzed parameter value, and the image processing mode recommendation information and the like are provided, the present disclosure may not be limited thereto and may be applied to various embodiments to be described below.

Figure 9:
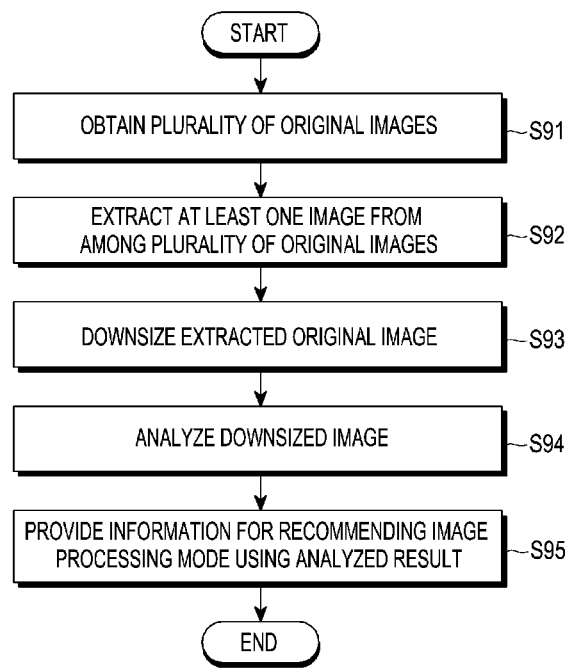
FIG. 9 is a flowchart illustrating an image processing method according to another embodiment of the present disclosure.

FIG. 9 is a flowchart illustrating an image processing method according to another embodiment of the present disclosure.

Figure 10:
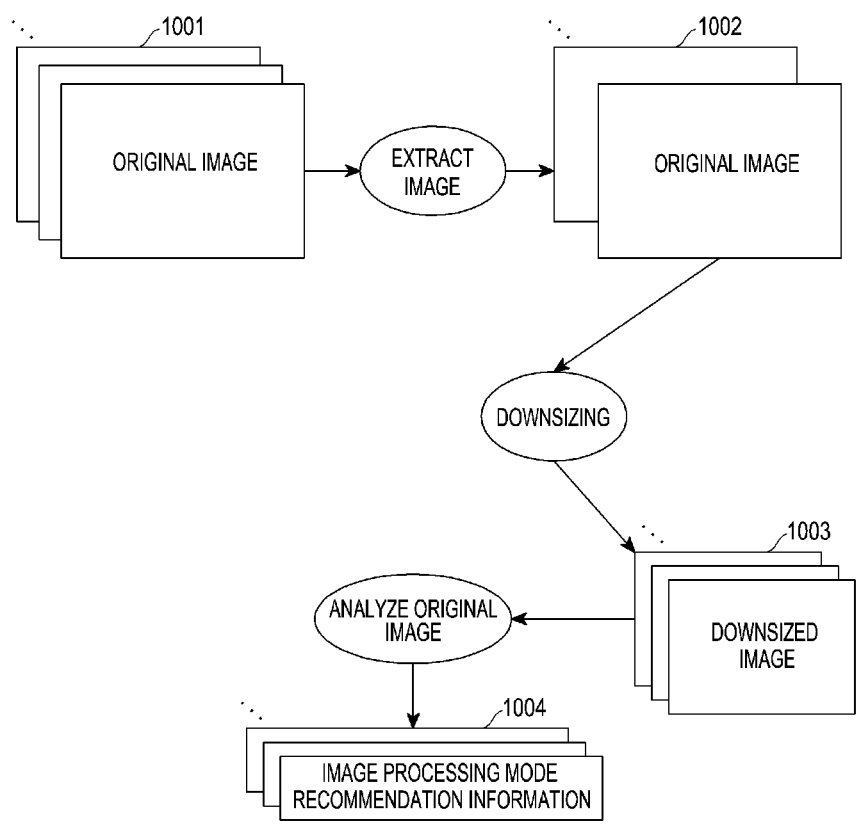
FIG. 10 is a block diagram illustrating an image processing method according to another embodiment of the present disclosure.

FIG. 10 is a block diagram illustrating an image processing method according to another embodiment of the present disclosure.

Referring to FIGS. 9 and 10, in operation S91 obtain a plurality of original images 1001, the obtaining of images may include an operation of receiving the original image 1001 that is provided through an image sensor. The image sensor may provide the original image 1001, based on a user input. For example, as a user input for photographing is generated (for example, an input on a photographing button, a touch input on a photographing button area, and the like), an original image 1001 that is used for composing images of various image processing modes are input. The original images 1001 may include a plurality of original images (for example, 30 pieces) which is input at time intervals (for example, 1/30 seconds), during a period of time (for example, a second) from a point in time when a user input is provided (for example, an input on a photographing button, a touch input on a photographing button area, and the like).

An operation of determining a recommended image processing mode, which is performed subsequently, is configured to detect an analyzed parameter value from each input original image, to apply each analyzed parameter value to an image processing mode supported in an electronic device, and to determine the recommended image processing mode. The operation of determining the recommended image processing mode expend a great amount of resources and time for image processing, leading to the fear that the processing speed of the electronic device will be slowed, battery consumption will increase, or a large amount of time will be expended to provide the recommended image processing mode information.

According to various embodiments of the present disclosure, an original image including essential information for determining a recommended image processing mode is detected and only the original image is analyzed, instead of determining the recommended image processing mode by analyzing all of the plurality of original images 1001. To this end, in operation S92, process an operation of extracting at least one original image including essential information for determining a recommended image processing mode, from among the plurality of original images 1001.

In operation S93, downsize an extracted original image 1002, and provides a downsized image 1003. In Operation S93 the downsizing of the original image 1002 may use an operation processed for the display of a preview image. Therefore, the size of the downsized image 1003 may be the size of the preview image.

In operation S94, information required for recommending an image processing mode may be analyzed from the downsized image 1003. For example, the information determined in operation S94 may include at least one parameter value (hereinafter, referred to as an 'analyzed parameter value') from among a face region, a facial expression, a size of a mobile object, a location of the mobile object, a movement of the mobile object, information associated with whether objects included in a plurality of original images overlap, and a correlation of the plurality of original images.

In operation S95, process an operation of recommending at least one image processing mode from among a plurality of image processing modes provided by the electronic device, using the information determined in operation S94 (for example, an analyzed parameter value). For example, operation S95 applies the analyzed parameter value detected with respect to each of the plurality of original images, to an image processing mode supported in the electronic device. Also, a degree of completeness for the image processing mode is determined. A recommended image processing mode may be determined based on the degree of completeness. For example, an image processing mode which has a degree of completeness higher than a threshold value may be determined to be the recommended image processing mode, or a number of image processing modes having a relatively high degree of completeness (for example, three image processing modes) may be determined to be the recommended image processing mode. For example, the image processing mode may include a best image mode, a best face mode, a drama image processing mode, a motion image processing mode, and the like. In operation S95, the obtained information, for example, image processing mode recommendation information 1004 may be provided. The image processing mode recommendation information may include at least one of the recommended image processing modes determined in operations S93 and S94, information associated with an original image used in the recommended image processing mode, a preview image corresponding to the recommended image processing mode, and a parameter value used for selecting the recommended image processing mode (please refer to FIG. 3).

The image processing mode recommendation information provided in operation S95 may be stored in association with a stored image (for example, encoding data), and may be variously applied to various applications executed in the electronic device.

As described above, according to another embodiment of the present disclosure, the electronic device may be configured to downsize an original image using an operation processed for the display of a preview image, and to detect an original image including essential information for determining a recommended image processing mode so as to analyze only the corresponding original image. Therefore, resources used for image processing may be efficiently used through the image processing method according to another embodiment of the present disclosure, and the recommended image processing mode information may be promptly provided.

According to various embodiments of the present disclosure described earlier, it has been described that a recommended image processing mode is determined after an original image is downsized so as to promptly and efficiently process the operation of determining the recommended image processing mode. However, the present disclosure may not be limited thereto, and the operation of determining a recommended image processing mode may be executed without the operation of downsizing an original image when an original image needs to be analyzed more precisely or when the electronic device includes sufficient resources (for example, battery power, a processor processing speed, storage capacity, or the like) for analyzing an original image. Hereinafter, an image processing method according to another embodiment of the present disclosure will be described by taking into consideration the above descriptions.

Figure 11:
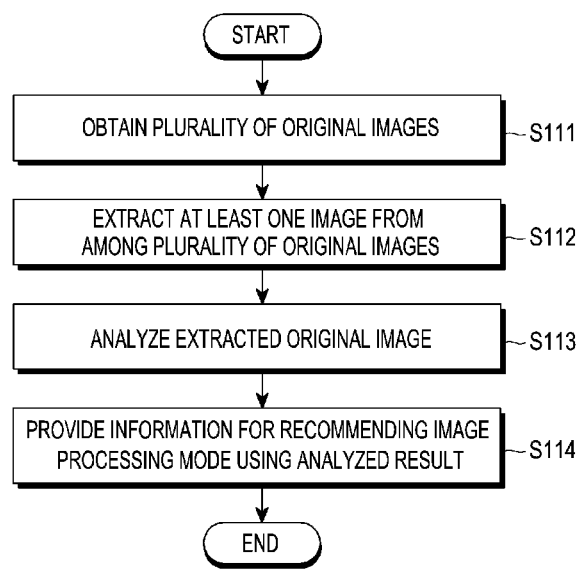
FIG. 11 is a flowchart illustrating an image processing method according to another embodiment of the present disclosure.

FIG. 11 is a flowchart illustrating an image processing method according to another embodiment of the present disclosure.

Figure 12:
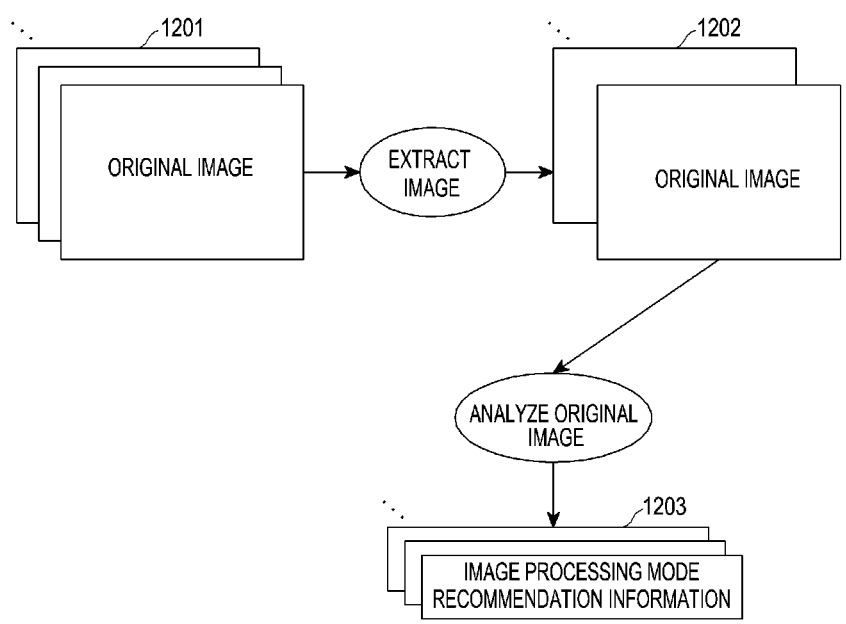
FIG. 12 is a block diagram illustrating an image processing method according to another embodiment of the present disclosure.

FIG. 12 is a block diagram illustrating an image processing method according to another embodiment of the present disclosure.

Referring to FIGS. 11 and 12, in operation S111, obtain a plurality of original images 1201, the obtaining may include an operation of receiving an original image 1201 that is provided through an image sensor. The image sensor may provide the original image 1201, based on a user input. For example, as a user input for photographing is generated (for example, an input on a photographing button, a touch input on a photographing button area, and the like), the original image 1201 that is used for composing images of various image processing modes is input. The original images 1201 may include a plurality of original images (for example, 30 pieces) which is input at time intervals (for example, 1/30 seconds), during a period of time (for example, a second) from a point in time when a user input is provided (for example, an input on a photographing button, a touch input on a photographing button area, and the like).

According to various embodiments of the present disclosure, an original image including essential information for determining a recommended image processing mode is detected and only the original image is analyzed, instead of determining the recommended image processing mode by analyzing all of the plurality of original images 1201. To this end, in operation S112, extract at least one original image 1202 including essential information for determining a recommended image processing mode, from among the plurality of original images 1201.

In operation S113, information required for recommending an image processing mode may be analyzed from the extracted original image 1202. For example, the information determined in operation S113 may include at least one parameter value (hereinafter, referred to as an 'analyzed parameter value') from among a face region, a facial expression, a size of a mobile object, a location of the mobile object, a movement of the mobile object, information associated with whether objects included in a plurality of original images overlap, and a correlation of the plurality of original images.

In operation S114, recommend at least one image processing mode from among a plurality of image processing modes provided by the electronic device, based on the information determined in operation S113 (for example, an analyzed parameter value). For example, operation S114 applies a parameter value detected with respect to each of the plurality of original images, to an image processing mode supported in the electronic device. A recommended image processing mode may be determined based on the degree of completeness. For example, an image processing mode which has a degree of completeness higher than a threshold value may be determined to be the recommended image processing mode, or a number of image processing modes having a relatively high degree of completeness (for example, three image processing modes) may be determined to be the recommended image processing mode. For example, the image processing mode may include a best image mode, a best face mode, a drama image processing mode, a motion image processing mode, and the like.

In operation S114, the obtained information, for example, image processing mode recommendation information 1203 may be provided. The image processing mode recommendation information may include at least one of the recommended image processing modes determined in operations S113 and S114, information associated with an original image used in the recommended image processing mode, a preview image corresponding to the recommended image processing mode, and a parameter value used for selecting the recommended image processing mode, and the like (please refer to FIG. 3).

The image processing mode recommendation information provided in operation S114 may be stored in association with a stored image (for example, encoding data), and may be variously applied to various applications executed in the electronic device.

Figure 13A:
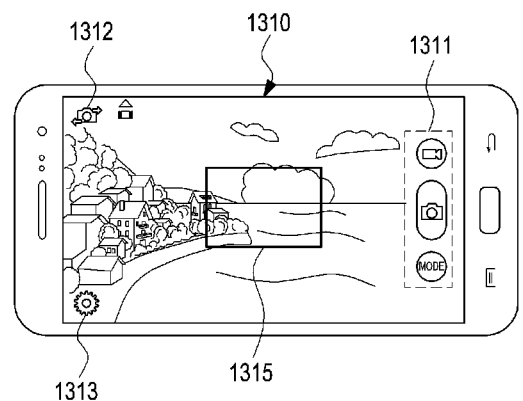
FIGS. 13A, 13B, and 13C are diagrams illustrating a user interface provided in an image processing method according to an embodiment of the present disclosure.
Figure 13B:
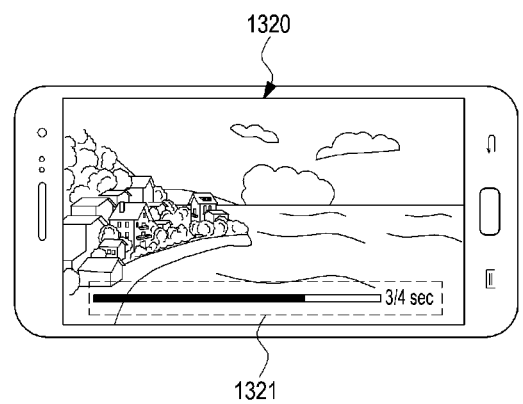
Figure 13C:
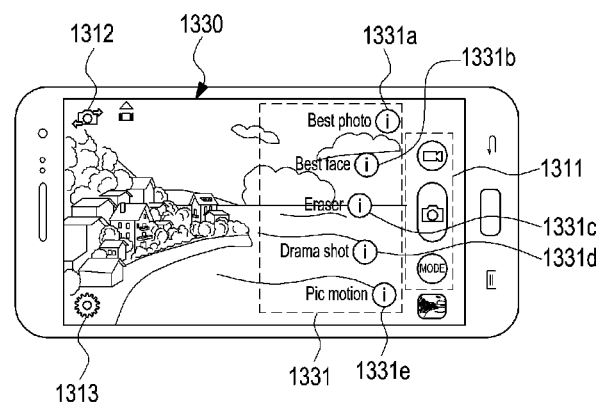

FIGS. 13A, 13B and 13C are diagrams illustrating a User Interface (UI) provided in an image processing method according to various embodiments of the present disclosure.

Referring to FIG. 13A, a camera UI 1310 provided in an image processing method according to various embodiments of the present disclosure is illustrated. The camera UI 1310 may be displayed in an electronic device as an operation of the image processing method according to various embodiments of the present disclosure begins. For example, as the electronic device beings the operation of a camera application, the operation of the image processing method according to various embodiments of the present disclosure may begin and the camera UI 1310 may be displayed together with a preview image. The camera UI 1310 may be displayed, overlapping the preview image, and may include a menu or a photographing button basically provided while the camera application is executed. For example, the camera UI 1310 may include a mode select menu 1311 for selecting an image processing mode (for example, a video image processing mode, an image processing mode, and a panorama image processing mode). The mode select menu 1311 may select an image processing mode by moving one of a plurality of image processing modes (for example, a video image processing mode, an image processing mode, and a panorama image processing mode) to the center of a corresponding area through a touch input or a drag gesture of a user. Also, the mode select menu 1311 may execute a function of the photographing button which generates a photographing-begin-input. For example, as a touch input of a user is provided to an indicator or an icon area that indicates the selected image processing mode, photographing an image may begin.

The camera UI 1310 may include a camera select menu 1312 for selecting a camera to be used for photographing, from among a plurality of cameras included in the electronic device. In addition, the camera UI 1310 may include a camera setting menu 1313 for receiving a camera setting value. Also, the camera UI 1310 may further include a focus indicator 1315 that indicates the focus of an image. The focus indicator 1315 is included in a focus area that is detected while an image photographing operation is executed, and the detected focus area may be visualized and displayed.

Referring to FIG. 13B, an image photographing UI 1320 provided in an image processing method according to various embodiments of the present disclosure is illustrated. The image photographing UI 1320 may be provided while a plurality of original images are obtained. For example, as a user input for photographing is generated (for example, an input on a photographing button, a touch input on a photographing button area, and the like), an operation of obtaining a plurality of original images may be executed. For example, using the mode select menu 1311 that functions as a photographing button, that is, as a touch input of a user is provided to an indicator or an icon area that indicates the selected image processing mode in the mode select menu 1311, the operation of obtaining the plurality of original images are executed, and in the process, the image photographing UI 1320 may be displayed. The image photographing UI 1320 may include an image photographing progress indicator 1321 that visualize sand displays the operation of obtaining the plurality of original images. Also, the image photographing UI 1320 may be displayed, overlapping an image (or a preview image) being photographed.

Referring to FIG. 13C, a recommended image processing mode providing UI 1330 which is provided in an image processing method according to various embodiments of the present disclosure is illustrated. The recommended image processing mode providing UI 1330 may be displayed while an operation of providing information for recommending an image processing mode is executed, which is illustrated in the various embodiments described earlier. The recommended image processing mode providing UI 1330 may be displayed, overlapping a preview image (or a photographed image), and may visualize and display the photographing mode recommendation information illustrated in the various embodiments described earlier. For example, the recommended image processing mode providing UI 1330 may include a recommended image processing mode indicator 1331 that visualizes and displays a recommended image processing mode which is determined in the various embodiments described earlier. The recommended image processing mode indicator 1331 may display an image processing mode determined as a recommended image processing mode to be distinguished from others, while displaying a plurality of image processing modes, for example, a best image mode 1331*a*, a best face mode 1331*b*, an eraser mode 1331*c*, a drama image processing mode 1331*d*, a motion image processing mode 1331*e*, and the like. For example, the image processing mode determined as the recommended image processing mode may be displayed to be relatively clearer than the remaining image processing modes that are different from the recommended image processing mode. As another example, the image processing mode determined as the recommended image processing mode is displayed in various colors, and the image processing mode that is different from the recommended image processing mode may be displayed in black and white colors.

Also, the recommended image processing mode providing UI 1330 may select the recommended image processing mode, using a user input provided in the recommended image processing mode indicator 1331. For example, in the state in which the plurality of image processing modes included in the recommended image processing mode indicator 1331, for example, the best image mode 1331*a*, the best face mode 1331*b*, the eraser mode 1331*c*, the drama image processing mode 1331*d*, and the motion image processing mode 1331*e*, are displayed, when a user input is provided to a corresponding area, information indicating selection of the corresponding image processing mode may be provided. The information indicating the selection of the corresponding image processing mode may be provided to a controller and the like of the electronic device and thus, an operation of image processing with respect to the corresponding image processing mode may be executed.

In the state in which the recommended image processing mode indicator 1331 is displayed, when a user input is provided in an area where the recommended image processing mode indicator 1331 is not displayed, the recommended image processing mode providing UI 1330 may be terminated. In response to the termination of the recommended image processing mode providing UI 1330, the camera UI 1310 may be displayed again.

Also, the recommended image processing mode providing UI 1330 may be displayed together with the camera UI 1310. Therefore, in the state in which the recommended image processing mode indicator 1331 is displayed, when a user input is provided in an area where the recommended image processing mode indicator 1331 is not displayed, the recommended image processing mode providing UI 1330 may be terminated and only the camera UI 1310 may be displayed. In addition, in the state in which the recommended image processing mode indicator 1331 is displayed, when a touch input of a user is provided in an indicator or an icon area that indicating an image processing mode of the mode select menu 1311 of the camera UI 1310, photographing an image may begin.

Figure 14:
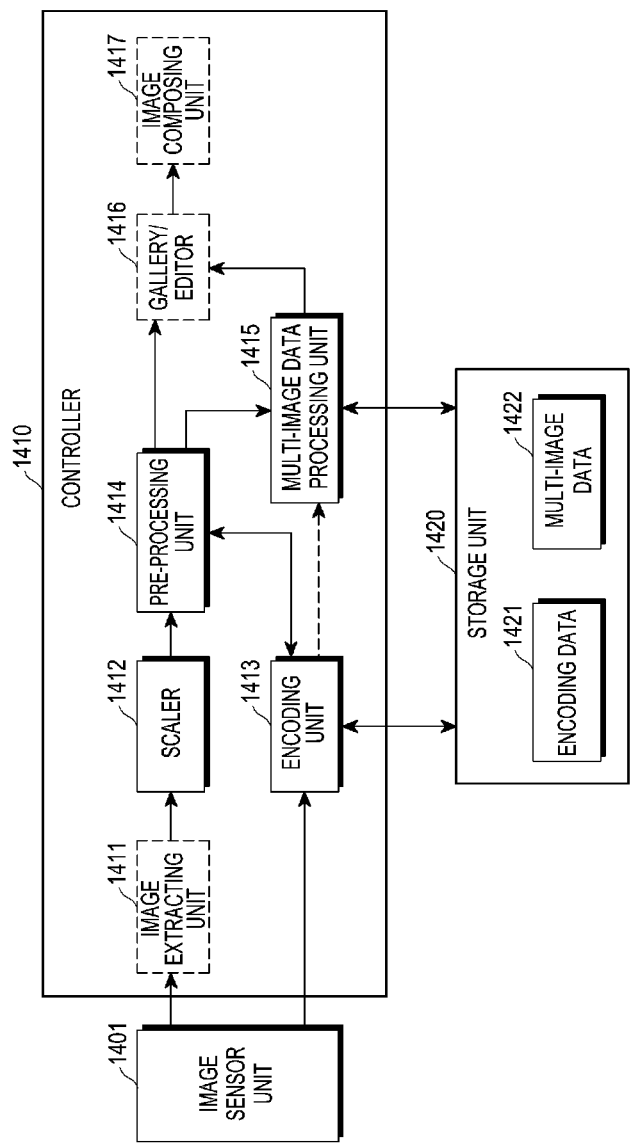
FIG. 14 is a block diagram illustrating an image processing apparatus according to an embodiment of the present disclosure.

FIG. 14 is a block diagram illustrating an image processing apparatus according to an embodiment of the present disclosure.

Referring to FIG. 14, the image processing apparatus according to an embodiment of the present disclosure may include an image sensor unit 1401, a controller 1410, and a storage unit 1420, but is not limited thereto.

The image sensor unit 1401 is controlled by the controller 1410, and provides an original image obtained by an image sensor to the controller 1410.

The image sensor unit 1401 may provide the original image based on a user input. For example, as a user input for photographing is generated (for example, an input on a photographing button, a touch input on a photographing button area, and the like), the controller 1410 requests the sensor unit 1401 to obtain an original image. Also, the image sensor unit 1401 may include a plurality of original images (for example, 30 pieces) input at time intervals (for example, $\frac{1}{30}$ seconds) during a period of time (for example, 1 second) from a point in time when the request for obtaining an original image is received.

The controller 1410 determines the original image, and analyzes information required for recommending an image processing mode. An operation of recommending at least one image processing mode from among a plurality of image processing modes provided by an electronic device may be processed using the determined information. This operation may be processed by a pre-processing unit 1414 included in the controller 1410. For example, the pre-processing unit 1414 applies a parameter value detected with respect to each of the plurality of original images, to an image processing mode supported in the electronic device. Also, a degree of completeness for the image processing mode is determined. A recommended image processing mode may be determined based on the degree of completeness. For example, an image processing mode which has a degree of completeness higher than a threshold value may be determined to be the recommended image processing mode, or a number of image processing modes having a relatively high degree of completeness (for example, three image processing modes) may be determined to be the recommended image processing mode. For example, the image processing mode may include a best image mode, a best face mode, a drama image processing mode, a motion image processing mode, and the like.

The pre-processing unit 1414 detects an analyzed parameter value from each input original image, and applies the analyzed parameter value to an image processing mode supported in the electronic device so as to determine a recommended image processing mode. It takes a great amount of resources and time to process the operation. Therefore, it is feared that a processing speed of the electronic device is reduced, a battery consumption increases, or a large amount of time is expended to provide recommended image processing mode information.

The image processing apparatus according to various embodiments of the present disclosure may provide a preview image of an input image to a display. The preview image may be formed to have a relatively smaller size and definition than an image photographed as a picture. To provide the preview image, the controller 1410 may include a scaler 1412 that downscales the original image provided from the image sensor unit 1401 to the size of the preview image.

The image processing apparatus according to various embodiments of the present disclosure may downsize the original image to further smoothly process the operation of the pre-processing unit 1414, and may process the operation of the pre-processing unit 1414 using the downsized image. By taking into consideration the above, the controller 1410 may be configured to enable the original image which is downsized to the size of the preview image through the scaler 1412, to be input to the pre-processing unit 1414.

The operation of determining the recommended image processing mode, in the pre-processing unit 1414 may expend a great amount of resources and time for image processing, so that it is feared that a processing speed of the electronic device is reduced, a battery consumption increases, or a large amount of time is expended to provide recommended image processing mode information. According to various embodiments of the present disclosure, the controller 1410 may detect an original image including essential information for determining a recommended image processing mode and analyzes only the original image, instead of determining the recommended image processing mode by analyzing all of the plurality of original images through the pre-processing unit 1414. To this end, the controller 1410 may further include an image extracting unit 1411 that extracts at least one original image including essential information for determining a recommended image processing mode. The image extracting unit 1411 may be included between the image sensor unit 1401 and the scaler 1412. As another example, the image extracting unit 1411 may be included between the scaler 1412 and the pre-processing unit 1414.

The controller 1410 may further include an encoding unit 1413. The encoding unit 1413 may encode an original image, and outputs encoding data. The encoding unit 1413 may execute encoding based on various encoding schemes (for example, JPEG and BMP), which are commonly used in the technical field of the present disclosure. The encoding data 1421 generated as described above may be used for a gallery application, an image editing application, and the like executed in the electronic device.

The encoding unit 1413 may provide the encoding data to the storage unit 1420, and the storage unit 1420 may store the encoding data 1421 and multi-image data 1422. Also, the encoding unit 1413 may provide information associated with the encoding data (hereinafter, referred to as 'encoding data information') to the pre-processing unit 1414. In response to this, the pre-processing unit 1414 may match the encoding data information and an original image (for example, a downsized image). The operation of matching the downsized image and the encoding data information may use a numbering scheme that assigns an identical identification number to the downsized image and the encoding data, which correspond to one another, or a synchronous execution scheme.

Although an embodiment of the present disclosure illustrates that the encoding data information is provided to the pre-processing unit 1414, and the pre-processing unit 1414 matches the downsized image and the encoding data information, the present disclosure may not be limited thereto. As another example, the encoding unit 1413 may provide the encoding data information to a multi-image data processing unit 1415. In response to this, the multi-image data processing unit 1415 may match the encoding data information and an original image (for example, a downsized image).

The encoding data information provided to the pre-processing unit 1414 or the multi-image data processing unit 1415 may include encoding data stream or information indicating an area where the encoding data is stored (for example, a URI and the like).

The multi-image data processing unit 1415 may generate a multi-image container including data provided from the pre-processing unit 1414 (or the encoding unit 1413). For example, a multi-image container that includes an original image (for example, a downsized image) used for a recommended image processing mode, and corresponding encoding data information, may be generated. Also, the pre-processing unit 1414 may provide the multi-image data processing unit 1415 with data (for example, an image processing mode recommendation information (please refer to FIG. 3) generated when the recommended image processing mode is determined, and the multi-image data processing unit 1415 may generate a multi-image container that includes an original image (for example, a downsized image), corresponding encoding data information, and image processing mode recommendation information.

In addition, the multi-image data processing unit 1415 may provide the multi-image container to a gallery/image edit processing unit 1416 and the like, and may be effectively used in a gallery application, an image editing application, and the like. The gallery/image edit processing unit 1416 may provide the edited multi-image container to the image composing unit 1417.

Hereinafter, the detailed operation of the pre-processing unit 1414 included in the image processing apparatus according to an embodiment of the present disclosure will be described.

The pre-processing unit 1414 included in the image processing apparatus according to an embodiment of the present disclosure determines a recommended image processing mode, based on information required for recommending an image processing mode, for example, at least one parameter value from among a face region, a facial expression, a size of a mobile object, a location of the mobile object, a movement of the mobile object, information associated with whether objects included in a plurality of original images overlap, and a correlation of the plurality of original images. For example, the information required for recommending the image processing mode (for example, the parameter value) may be applied to each image processing mode and thus, a degree of completeness for the image processing mode may be determined. A recommended image processing mode may be determined based on the degree of completeness. For example, an image processing mode which has a degree of completeness higher than a threshold value may be determined to be the recommended image processing mode, or a number of image processing modes having a relatively high degree of completeness (for example, three image processing modes) may be determined to be the recommended image processing mode.

Through the operation, the pre-processing unit 1414 may distinguish an image processing mode that is recommended and an image processing mode that is not recommended. Based on the above, the pre-processing unit 1414 may detect a downsized image to be used for the image processing mode that is recommended, from a plurality of downsized images. The pre-processing unit 1414 may combine downsized images so as to generate a preview image for the recommended image processing mode, and may output the same through a display.

Also, the pre-processing unit 1414 may determine an original image that is not used for the recommended image processing mode, and may remove the original image that is not used for the recommended image processing mode. In this manner, the pre-processing unit 1414 may remove images that are obtained from previous operations but have a low utilization since they are not used for the recommended processing mode, for example, an original image, a downsized image, or encoding data. Therefore, there may be provided an advantageous effect that may prevent the use of resources for generating unnecessary data or the wasting of a storage for storing unnecessary data.

Also, the pre-processing unit 1414 may provide the encoding unit 1413 with information associated with an original image that is not used for the recommended image processing mode. Therefore, the encoding unit 1413 may not execute encoding with respect to the original image that is not used for the recommended image processing mode.

Figure 15:
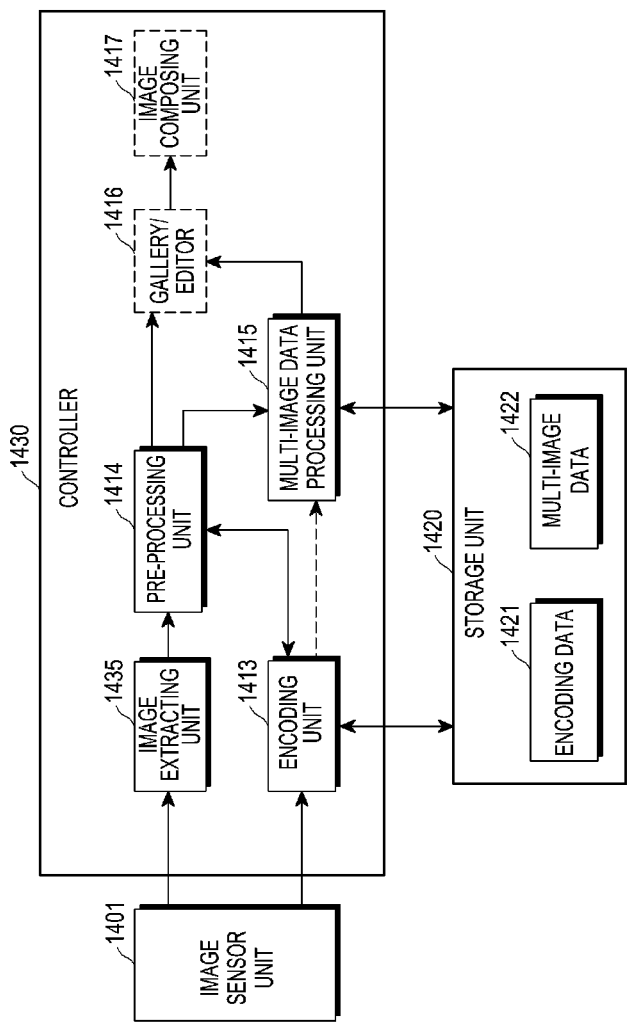
FIG. 15 is a block diagram illustrating an image processing apparatus according to another embodiment of the present disclosure.

FIG. 15 is a block diagram illustrating an image processing apparatus according to another embodiment of the present disclosure.

Referring to FIG. 15, the image processing apparatus according to another embodiment of the present disclosure may include the image sensor unit 1401, a controller 1430, and the storage unit 1420.

The image sensor unit 1401 and the storage unit 1420 included in the image processing apparatus of FIG. 15 may be configured to be identical to the image sensor unit 1401 and the storage unit 1420 included in the image processing apparatus according to an embodiment of the present disclosure, that is, the image processing apparatus of FIG. 13.

The controller 1430 included in the image processing apparatus according to another embodiment of the present disclosure may be configured to be somewhat different from the controller 1410 included in the image processing apparatus of FIG. 14.

Particularly, the image processing apparatus according to an embodiment of the present disclosure described earlier downsizes an original image and determines a recommended image processing mode, so as to promptly and efficiently process the operation of determining a recommended image processing mode. However, the present disclosure may not be limited thereto, and the operation of determining a recommended image processing mode may be executed without the operation of downsizing an original image when an original image needs to be analyzed more precisely or when the electronic device includes sufficient resources (for example, a battery, a processor processing speed, a storage capacity, or the like) for analyzing an original image.

The image processing apparatus according to another embodiment of the present disclosure detects an original image including essential information for determining a recommended image processing mode and analyzes the corresponding original image, instead of determining the recommended image processing mode by analyzing all of the plurality of original images through the image sensor unit 1401. To this end, an image extracting unit 1435 extracts at least one original image including essential information for determining a recommended image processing mode from among a plurality of original images provided through the image sensor unit 1401, and provides the extracted original image to the pre-processing unit 1414.

Accordingly, the pre-processing unit 1414 may analyze information required for recommending an image processing mode, from the extracted original image.

The operation in which the pre-processing unit 1414 analyzes information required for recommending an image processing mode from the extracted original image, the operation in which the encoding unit 1413 encodes an original image, the operation in which the multi-image processing unit 1415 generates and provides a multi-image container, may be executed in the same manner as the image processing apparatus according to an embodiment of the present disclosure.

Figure 16:
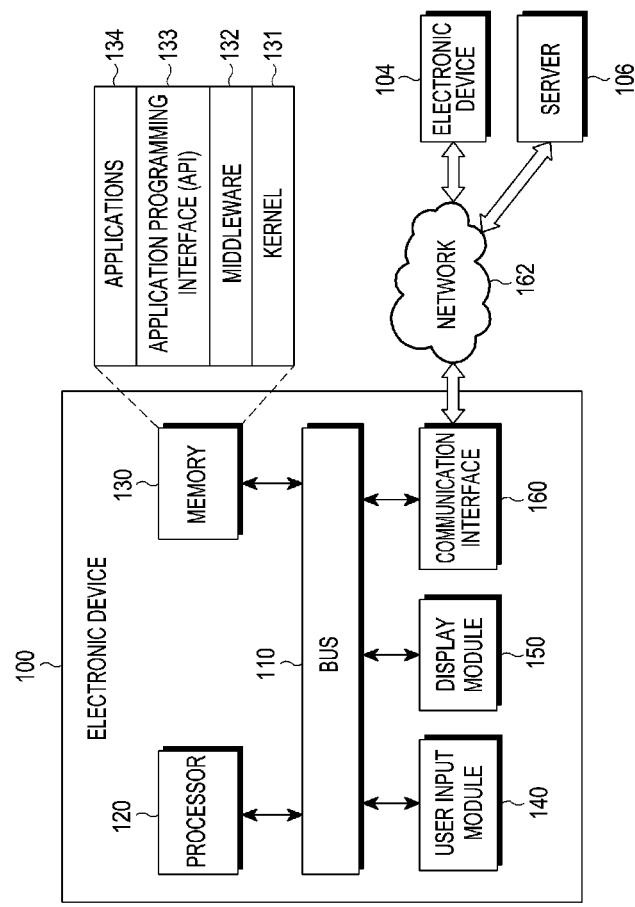
FIG. 16 is a block diagram of an electronic device to which an image processing method and apparatus are applied according to an embodiment of the present disclosure.

FIG. 16 is a block diagram of an electronic device to which an image processing method and apparatus are applied according to various embodiments of the present disclosure.

Referring to FIG. 16, an electronic device 100 may include a bus 110, a processor 120, a memory 130, a user input module 140, a display module 150, or a communication interface 160.

The bus 110 may be a circuit to connect the above-described component elements with each other, and to transfer a communication (e.g., control messages) between the above-described component elements.

The processor 120 may receive commands from other component elements (for example, the memory 130, the user input module 140, the display module 150, and the communication module 160) through the bus 110, analyze the received commands, and execute calculation or data processing according to the analyzed commands.

The memory 130 may store commands or data, received from the processor 120 or other component elements (for example, the user input module 140, the display module 150, and the communication module 160) or generated by the processor 120 or other component elements. The memory 130 may include programming modules such as, for example, a kernel 131, a middleware 132, an Application Programming Interface (API) 133, an application 134, or the like. Each of the programming modules may be configured with software, firmware, hardware, or a combination of at least two of them.

The kernel 131 may control or manage system resources (for example, the bus 110, the processor 120, the memory 130, or the like) which are used in performing operations or functions implemented by other programming modules, for example the middleware 132, the API 133 or the applications 134. Further, the kernel 131 may provide interfaces by which the middleware 132, the API 133 or the applications 134 may access each element of the electronic device 100 for control or management.

The middleware 132 may play an intermediate role between the API 133 or the applications 134 and the kernel 131 to communicate with each other for transmission and reception of data. Further, in association with operation requests received from the (plurality of) applications 134, the middleware 132 performs load balancing of the operation requests by using a method of assigning a priority for use of the system resources (for example, the bus 110, the processor 120, the memory 130 and the like) of the electronic device 100, to at least one of the applications 134.

The API 133 is an interface by which the application 134 controls a function provided by the kernel 131 or the middleware 132, and may include, for example, at least one interface or function for a file control, a window control, image processing, or a character control.

For example, the user input module 140 may receive a command or data from the user and transmit the command or the data to the processor 120 or the memory 130 through the bus 110. The display module 150 may display a video, an image, data, or the like for the user.

The communication module 160 may connect communication between another electronic device 102 and the electronic device 100. The communication module 160 may support a short-range communication protocol 162 (for example, Wireless Fidelity (WiFi), BlueTooth (BT), or Near Field Communication (NFC)), or network communication (for example, Internet, Local Area Network (LAN), Wide Area Network (WAN), telecommunication network, cellular network, or satellite network, a Plain Old Telephone Service (POTS) or the like). Each of the electronic devices 102 and 104 may be a device which is identical to the electronic device 100 (for example, an identical type of device) or another device (for example, a different type of device).

Figure 17:
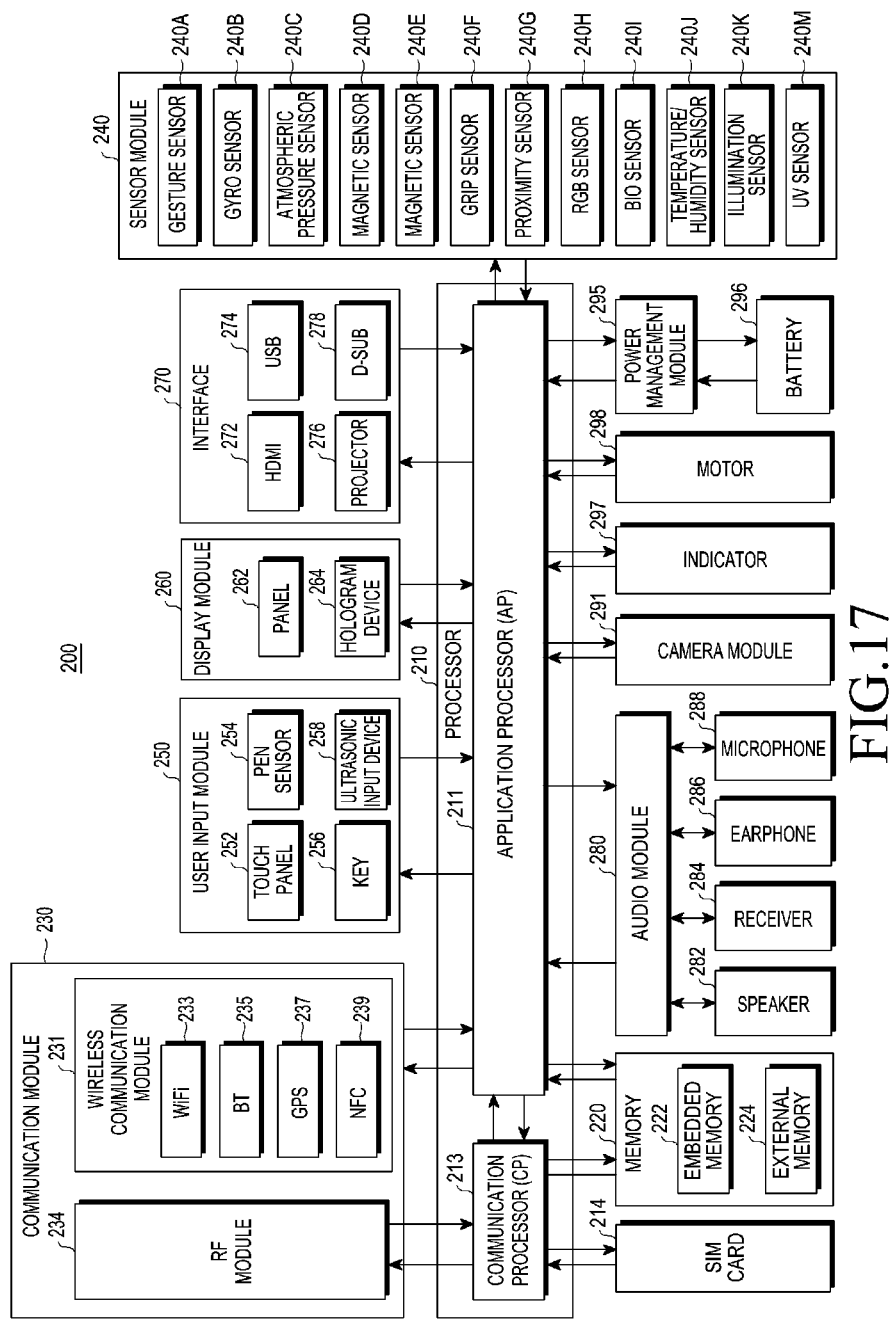
FIG. 17 is a block diagram of a hardware device to which an image processing method and apparatus are applied according to an embodiment of the present disclosure.

FIG. 17 is a block diagram of a hardware device to which an image processing method and apparatus are applied according to various embodiments of the present disclosure. A hardware device 200 may be, for example, the electronic device 100 shown in FIG. 16.

Referring to FIG. 17, the hardware device 200 may include at least one processor 210, a Subscriber Identification Module (SIM) card 214, a memory 220, a communication module 230, a sensor module 240, a user input module 250, a display module 260, an interface 270, an audio codec 280, camera module 291, a power management module 295, a battery 296, an indicator 297, or a motor 298.

The processor 210, for example, the processor 120, may include at least one Application Processor (AP) 211 or at least one Communication Processor (CP) 213. The processor 210 may be, for example, the processor 120 shown in FIG. 16. Although the AP 211 and the CP 213 are included in the processor 210 in FIG. 17, the AP 211 and the CP 213 may be included in different IC packages, respectively. According to an embodiment, the AP 211 and the CP 213 may be included in one IC package.

The AP 211 may derive an Operating System (OS) or an application program so as to control a multitude of hardware or software component elements connected with the AP 21, and perform processing of various data including multimedia data and calculation The AP 211 may be implemented as, for example, a System on Chip (SoC). According to an embodiment, the processor 210 may further include a Graphic Processing Unit (GPU).

The CP 213 may manage data links and perform a function of changing communication protocols in communication between electronic devices (for example, the electronic device 100) including hardware 200 and other electronic devices connected over a network. The CP 213 may be implemented as, for example, a SoC. According to an embodiment, the CP 213 may perform at least a part of multimedia control functions. The CP 213 may perform identification and authentication of an electronic device in communication networks by using, for example, subscriber identification modules (for example, the SIM card 214). In addition, the CP 213 may provide a user with services such as voice calls, video calls, text messages, packet data, or the like.

Further, the CP 213 may control transmission and reception of data of the communication module 230. In FIG. 17, although component elements such as the CP 213, the power management module 295, the memory 220, or the like are illustrated as separate component elements from the AP 211, the AP 211 may be implemented to include at least one (for example, the CP 213) of the above-described component elements according to an embodiment of the present disclosure.

According to an embodiment of the present disclosure, the AP 211 or the CP 213 may load, to a volatile memory, commands or data received from at least one of a non-volatile memory or other component elements which are connected with the AP 211 and the CP 213, and process the same. In addition, the AP 211 or the CP 213 may store, in a non-volatile memory, data that is received from or generated by at least one of the component elements.

The SIM card 214 may be a card embodying a subscriber identification module, and may be inserted into a slot formed in a particular portion of the electronic device. The SIM card 214 may include a unique identification information (for example, an Integrated Circuit Card Identifier (ICCID)) or subscriber information (for example, an International Mobile Subscriber Identity (IMSI)).

The memory 220 may include an embedded memory 222 or an external memory 224. The memory 220 may be, for example, the memory 130 shown in FIG. 15. The embedded memory 222 may include at least one of a volatile memory (for example, a Dynamic Random Access Memory (DRAM), a Static RAM (SRAM), or a Synchronous Dynamic RAM (SDRAM)) and a non-volatile memory (for example, an One-Time Programmable Read Only Memory (OTPROM), a programmable ROM (PROM), an Erasable and Programmable ROM (EPROM), an Electrically Erasable and Programmable ROM (EEPROM), a mask ROM, a flash ROM, an NAND flash memory, or an NOR flash memory). According to an embodiment of the present disclosure, the embedded memory 222 may be in a form of Solid-State Drive (SSD). The external memory 224 may further include a flash drive, for example, a Compact Flash (CF), a Secure Digital (SD), a Micro Secure Digital (Micro-SD), a Mini Secure Digital (Mini-SD), an Extreme Digital (xD), a Memory Stick, or the like.

The communication module 230 may include a wireless communication module 231 or a Radio Frequency (RF) module 234. The communication module 230 may be, for example, the communication module 160 illustrated in FIG. 16. The wireless communication module 231 may include, for example, WiFi 233, BT 235, a Global Positioning System (GPS) 237, or a NFC 239. For example, the wireless communication module 231 may provide a wireless communication function using wireless frequencies. Additionally and alternatively, the wireless communication module 231 may include a network interface (for example, a LAN card) or a modem in order to connect the hardware device 200 with a network (for example, the Internet, a LAN, a Wire Area Network (WAN), a telecommunication network, a cellular network, a satellite network, a POTS, or the like).

The RF module 234 may perform transmission and reception of data, for example, RF signals or called electromagnetic signals. Although not shown in the drawings, the RF unit 234 may include, for example, a transceiver, a Power Amp Module (PAM), a frequency filter, a Low Noise Amplifier (LNA), and the like. Also, RF module 234 may further include components, for example, a conductor or a cable for transmitting and receiving electromagnetic waves through a free space in wireless communication.

The sensor module 240 may include at least one of, for example, a gesture sensor 240A, a gyro-sensor 240B, an atmospheric pressure sensor 240C, a magnetic sensor 240D, an acceleration sensor 240E, a grip sensor 240F, a proximity sensor 240G, a Red-Green-Blue (RGB) sensor 240H, a bio-sensor 240I, a temperature/humidity sensor 240J, an illuminance sensor 240K, an ultra violet sensor 240M, or the like. The sensor module 240 may measure physical quantities or sense an operation state of the electronic device, so as to convert the measured or sensed information to electric signals. Additionally and alternatively, the sensor module 240 may include, for example, an E-nose sensor (not shown), an Electromyography (EMG) sensor (not shown), an Electroencephalogram (EEG) sensor (not shown), an Electrocardiogram (ECG) sensor (not shown), a fingerprint sensor, or the like. The sensor module 240 may further include a control circuit for controlling at least one sensor included in the sensor module 240.

The user input module 250 may include a touch panel 252, a (digital) pen sensor 254, a key 256, or an ultrasonic input device 258. The user input module 250 may be, for example, the user input module 140 illustrated in FIG. 15. The touch panel 252 may recognize a touch input based on at least one of, for example, a capacitive type, a resistive type, an infrared type, and an ultrasonic type. In addition, the touch panel 252 may further include a controller (not shown). In the case of the capacitive type, the proximity as well as direct touches may be detected. The touch panel 252 may also include a tactile layer. In this case, the touch panel 252 may provide a tactile response to a user.

The (digital) pen sensor 254 may be implemented, for example, using a method identical or similar to receiving a touch input of a user or using a separate recognition sheet. As the key 256, for example, a keypad or touch key may be used. The ultrasonic input device 258 may use a pen that generates ultrasonic signals, and the electronic device senses acoustic waves with a microphone (for example, a microphone 288) and identifies data. The ultrasonic input device 258 may perform wireless recognition. According to an embodiment of the present disclosure, the hardware device 200 may receive a user input from an external device (for example, a network, a computer, or a server) which is connected with the communication module 230 by using the communication module 230.

The display module 260 may include a panel 262 or a hologram 264. The display module 260 may be, for example, the display module 150 illustrated in FIG. 15. The panel 262 may be, for example, a Liquid Crystal Display (LCD), Active-Matrix Organic Light Emitting Diode (AM-OLED), or the like. The panel 262 may be implemented to be, for example, flexible, transparent, or wearable. The panel 262 may also be configured to be a single module integrated with the touch panel 252. The hologram 262 may display a three-dimensional (3D) image in the air by using interference of light. According to an embodiment of the present disclosure, the display module 260 may further include a control circuit for controlling the panel 262 or the hologram 264.

The interface 270 may include, for example, a High-Definition Multimedia Interface (HDMI) 272, a Universal Serial Bus (UBS) 274, a projector 276, or a D-subminiature (D-sub). Additionally or alternatively, the interface 270 may include, for example, a Secure Digital (SD)/Multi-Media Card (MMC) (not shown) or an Infrared Data Association (IrDA) (not shown).

The audio codec 280 may convert voices to electric signals, and vice versa. The audio codec 280 may convert voice information input or output through, for example, a speaker 282, a receiver 284, an earphone 286, a microphone 288, or the like.

The camera module 291 is a device for photographing still and moving images, and may include at least one image sensor (for example, a front lens or a back lens), an Image Signal Processor (ISP) (not shown), or a flash LED (not shown) according to an embodiment of the present disclosure.

The power management module 295 may manage power of the hardware device 200. Although not shown, the power management module 295 may include, for example, a Power Management Integrated Circuit (PMIC), a charger Integrated Circuit (IC), or a battery fuel gauge.

The PMIC may be mounted in, for example, an IC or an SoC semiconductor. Charging methods may be classified into wired charging and wireless charging. The charger IC may charge a battery, and may prevent an overvoltage or excess current from being induced or flowing from a charger. According to an embodiment of the present disclosure, the charger IC may include a charger IC for at least one of the wired charging type or the wireless charging type. The wireless charging type may include, for example, a magnetic resonance type, a magnetic induction type or an electromagnetic wave type, and additional circuits for wireless charging, for example, a coil loop, a resonance circuit, a rectifier, or the like may be added.

The battery fuel gauge may measure, for example, the remaining amount of battery or a voltage, current, or temperature during charging. The battery 296 may generate and supply power, and may be, for example, a rechargeable battery.

The indicator 297 may display a state, for example, a boot-up state, a message state or a charging state of the entirety or a part (for example, the AP 211) of the hardware device 200. The motor 298 may convert an electrical signal into a mechanical vibration.

Although not shown, the hardware device 200 may include a processing device (for example, a GPU) for supporting a mobile TV. The processing device for supporting a mobile TV function may process media data pursuant to a certain standard such as, for example, Digital Multimedia Broadcasting (DMB), Digital Video Broadcasting (DVB), media flow, or the like.

Each of the above-described component elements of hardware according to the present disclosure may be configured with at least one component, and the names of the corresponding component elements may vary based on the type of electronic device. The hardware according to the present disclosure may be configured to include at least one of the above-described component elements, and some of the component elements may be omitted or other component elements may be added. In addition, some of the elements of the hardware according to the present disclosure may be combined as a single entity, and may perform the same functions of those of original element components.

The term "module" used in the present disclosure may refer to, for example, a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be the smallest unit that performs at least one function or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereafter.

Figure 18:
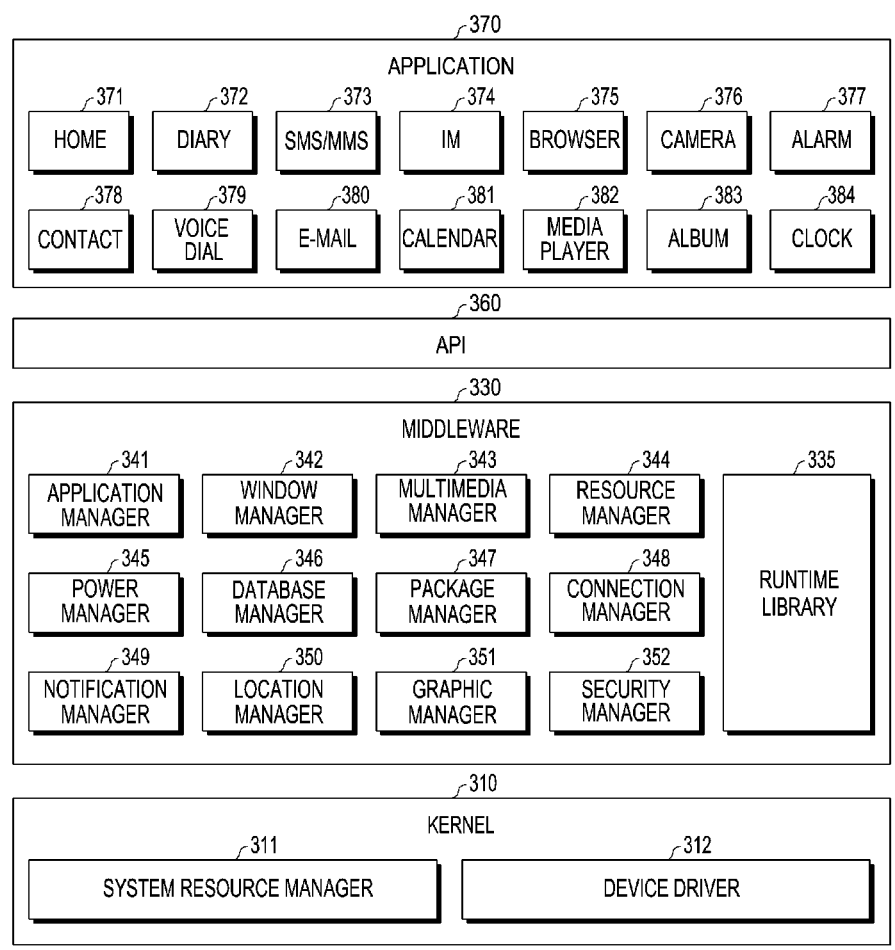
FIG. 18 is a block diagram of a programming module to which an image processing method and apparatus are applied according to an embodiment of the present disclosure.

FIG. 18 is a block diagram of a programming module to which an image processing method and apparatus are applied according to an embodiment of the present disclosure.

The programming modules 300 may be included (for example, stored) in the electronic device 100 (for example, the memory 130) of FIG. 16. At least a part of the programming modules 300 may be configured with software, firmware, hardware, or a combination of at least two of them. The programming modules 300 may be implemented in the hardware (for example, the hardware device 200) and include an OS for controlling resources related to an electronic device (for example, the electronic device 100), or various applications (for example, an application 370) operated in the operating system. For example, the OS may be Android, iOS, Windows, Symbian, Tizen, Bada, or the like.

Referring to FIG. 18, the programming modules 300 may include a kernel 310, a middleware 330, an API 360, or the application 370.

The kernel 310 (for example, the kernel 131) may include a system resource manager 311 or a device driver 312. The system resource manager 311 may include, for example, a process manager 313, a memory manager 315, a file system manager 317, or the like. The system resource manager 311 may perform the control, allotment or collection of the system resources. The device driver 312 may include, for example, a display driver 314, a camera driver 316, a BT driver 318, a shared memory driver 320, a USB driver 322, a keypad driver 324, a Wi-Fi driver 326, or an audio driver 328. In addition, according to an embodiment of the present disclosure, the device driver 312 may include an Inter-Process Communication (IPC) driver (not shown).

The middleware 330 may include a plurality of modules which have been implemented to provide functions required in common for the application 370. Further, the middleware 330 may provide functions through the API 360 in order to allow the application 370 to effectively use limited system resources in the electronic device.

Referring to FIG. 18, the middleware 330 (for example, the middleware 132) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and security manager 352.

The run time library 335 may include, for example, a library module that a compiler uses in order to add new functions through a programming language while the application 370 is executed. According to an embodiment of the present disclosure, the run time library 335 may execute functions of input/output, managing a memory, an arithmetic function, or the like.

The application manager 341 may manage, for example, a life cycle of at least one application among the applications 370. The window manager 342 may manage a GUI resource used in the screen. The multimedia manager 343 may identify formats for playing back various media files, and perform encoding or decoding of media files using a codec corresponding to each format. The resource manager 344 may manage resources such as a source code, a memory or a storage space of at least one application among the applications 370.

The power manager 345 may manage a battery or power by operating together with a Basic Input/Output System (BIOS), and provide power information required for the operation. The database manager 346 may manage to generate, search or change a database that is to be used in at least one of the applications 370. The package manager 347 may manage the installation or the updating of applications distributed in the form of package file.

The connectivity manager 348 may manage wireless connection of, for example, Wi-Fi or BT. The notification manager 349 may display or notify an event such as a received message, an appointment, and a proximity notification to a user without disturbance. The location manager 350 may manage location information of the electronic device. The graphic manager 351 may manage graphic effects to be provided to a user and user interfaces related to the graphic effects. The security manager 352 may provide various security functions required for system security or user authentication. According to an embodiment of the present disclosure, when an electronic device (for example, the electronic device 100) has a phone call function, the middleware 330 may further include a telephony manager (not shown) for managing functions of a voice call or a video call of the electronic device.

The middleware 330 may generate and use a new middleware module through a combination of various functions of the above-described internal element modules. The middleware 330 may provide modules specialized for each type of OS in order to provide differentiated functions. In addition, a few exiting component elements may be dynamically removed from the middleware 330, or new component elements may be added to the middleware 330. Therefore, a few component elements described in the embodiments of the present disclosure may be omitted, or other component elements may be added, and alternatively, component elements may be replaced with component elements in different names which perform the same functions.

The API 360 (for example, the API 133) is a group of API programming functions, and may be provided with a different configuration according to an operating system. For example, in Android or iOS, a single API set may be provided for each platform. In Tizen, for example, two or more API sets may be provided.

The application 370 (for example, the application 134) may include, for example, a preloaded application or a third party application, which may include a home application 371, a diary application 372, an SMS/MMS application 373, an IM application 374, a browser application 375, a camera application 376, an alarm application 377, a contact application 378, a voice dial application 379, an e-mail application 380, a calendar application 381, a media player application 382, an album application 383, a clock application 384, and any other similar and/or suitable applications.

At least a part of the programming module 300 may be implemented by an instruction stored in a computer-readable storage medium. When the instruction is performed by at least one processor (for example, the processor 210), the at least one processor may perform a function corresponding to the instruction. The computer-readable storage medium may be, for example, the memory 260. At least a part of the programming modules 300 may be implemented (for example, performed) by, for example, the processor 210. At least a part of the programming modules 300 may include, for example, a module, a program, a routine, sets of instructions and/or a process for performing at least one function.

Names of component elements of a programming modules (for example, the programming module 300) according to the present disclosure may be changed based on a type of operating system. The programming module according to the present disclosure may include at least one of the above-described component elements, exclude a few of them, or further include other component elements. Operations performed by the programming module or other component elements according to the present disclosure may be processed sequentially, concurrently, repeatedly or heuristically, and a few operations may be omitted, or other operations may be added.

According to various embodiments of the present disclosure, there is provided an image processing method, and the method of processing an image photographed by an electronic device may include obtaining a plurality of original images from an image photographed, analyzing the plurality of original images, and providing information for recommending an image processing mode, based on at least a part of an analyzed result.

Analyzing the plurality of original images may include downsizing at least one image from among the plurality of original images, and obtaining a downsized image.

Analyzing the plurality of original images may include analyzing the downsized image.

Analyzing the plurality of original images may include deleting at least one of the downsized images, based on the analyzed result.

The image processing method according to various embodiments of the present disclosure may include generating encoding data obtained by encoding the plurality of original images; matching the downsized image and the encoding data; and generating a multi-image container, including at least one piece of information associated with the downsized image and information associated with the encoding data.

Analyzing the plurality of original images may include extracting at least one of the original images included in the plurality of original images; and analyzing the at least one extracted original image.

Analyzing the plurality of original images may include determining at least one parameter value from among a face region, a facial expression, a size of a mobile object, a location of the mobile object, a movement of the mobile object, information associated with whether objects included in the plurality of original images overlap, and a correlation of the plurality of original images.

Providing the information for recommending the image processing mode may include determining the image processing mode that is recommended, based on at least one determined parameter value.

Providing the information for recommending the image processing mode may include deleting at least one of the original images, based on the determination.

The image processing method according to various embodiments may further include generating each image corresponding to the image processing mode that is recommended, by combining the plurality of original images, and providing each generated image.

Also, the image processing method may include generating encoding data obtained by encoding the plurality of original images, and generating a multi-image container including at least one of information associated with the encoding data and the at least one parameter value.

An image processing apparatus according to various embodiments of the present disclosure may include an image sensor unit that generates and provides an original image, a controller that analyzes a plurality of original images, and provides information for recommending an image processing mode based on at least a part of an analyzed result, and a memory unit that stores at least one of the plurality of original images and encoding data obtained by encoding the plurality of original images.

The controller may include a scaler that downsizes at least one original image from among the plurality of original images, and provides at least one downsized image, and a pre-processing unit that analyzes the at least one downsized image and provides information for recommending an image processing mode based on an analyzed result.

The controller may include an original image extracting unit that extracts at least one image from the plurality of original images, and a pre-processing unit that analyzes at least one extracted original image, and provides information for recommending the image processing mode based on an analyzed result.

The controller may include an encoding unit that generates encoding data by encoding the original images and stores the encoding data.

The controller may further include a multi-image data processing unit that generates and stores multi-image data including information associated with the original images and information associated with the encoding data.

The pre-processing unit may perform determining at least one parameter value from among a face region, a facial expression, a size of a mobile object, a location of the mobile object, a movement of the mobile object, information associated with whether objects included in the plurality of original images overlap, and a correlation of the plurality of original images.

The pre-processing unit may determine the image processing mode that is recommended, based on the at least one determined parameter value.

The pre-processing unit may delete at least one of the original images, based on the determination.

The pre-processing unit may generate each image corresponding to the image processing mode that is recommended by combining the plurality of original images, and providing each generated image.

The apparatus may include an encoding unit that generates encoding data obtained by encoding the original images and stores the encoding data, and a multi-image data processing unit that generates and stores multi-image data including information associated with the original images, information associated with the encoding data, and at least one parameter value.

According to various embodiments of the present disclosure, there is provided a storage medium storing instructions, and the instructions are set to instruct at least one processor to execute at least one operation when the instructions are executed by the at least one processor, and the at least one operation includes an operation of analyzing a plurality of original images obtained from an image photographed, and an operation of providing information for recommending an image processing mode, based on at least a part of an analyzed result.

According to various embodiments of the present disclosure, there is provided an image processing method, and the method of processing an image photographed by an electronic device may include obtaining a plurality of original images from an image photographed, generating encoding data obtained by encoding the plurality of original images, downsizing at least one image from among the plurality of original images, analyzing the downsized image, providing information for recommending an image processing mode based on an analyzed result, and generating a multi-image container including encoding data matched to the downsized image.

An image processing apparatus according to various embodiments of the present disclosure may include an image sensor unit that generates and provides an original image, a scaler that downsizes at least one image from among a plurality of original images, an encoding unit that generates encoding data by encoding original images and stores the encoding data, a memory unit that stores at least one of the downsized image and the encoding data, a pre-processing unit that analyzes the downsized image and provides information for recommending an image processing mode based on an analyzed result, and a multi-image data processing unit that generates and stores multi-image data including information associated with the original image and information associated with the encoding data.

According to various embodiments of the present disclosure, there is provided a storage medium storing instructions, and the instructions are set to instruct at least one processor to execute at least one operation when the instructions are executed by the at least one processor, and the at least one operation includes an operation of generating encoding data obtained by encoding a plurality of original images obtained through an image sensor, an operation of downsizing at least one image from among the plurality of original images, an operation of analyzing the downsized image, an operation of providing information for recommending an image processing mode based on an analyzed result, and an operation of generating a multi-image container including encoding data matched to the downsized image.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of processing images photographed by an electronic device, the method comprising:
    obtaining a plurality of original images from the images photographed;
    detecting parameter values related to at least one image processing mode from each of the plurality of original images by analyzing the plurality of original images;
    applying the parameter values to a plurality of image processing modes;
    determining the at least one image processing mode which has a degree of completeness higher than a threshold value among the plurality of image processing modes using a value of each of the plurality of image processing modes to which the parameter values are applied;
    determining a recommended image processing mode based on the degree of completeness; and
    providing the recommended image processing mode, based on comparing the value of each of the plurality of image processing modes to which the parameter values are applied and the threshold value.

2. The method of claim 1, wherein the analyzing of the plurality of original images comprises:
    downsizing at least one image from among the plurality of original images, and obtaining a downsized image.

3. The method of claim 2, wherein the analyzing of the plurality of original images comprises:
    analyzing the downsized image.

4. The method of claim 2, wherein the analyzing of the plurality of original images comprises:
    deleting at least one of the downsized images, based on the analyzed result.

5. The method of claim 2, further comprising:
    generating encoding data obtained by encoding the plurality of original images;
    matching the downsized image and the encoding data; and
    generating a multi-image container, including at least one of information associated with the downsized image and information associated with the encoding data.

6. The method of claim 1, wherein the analyzing of the plurality of original images comprises:
    extracting at least one of the original images included in the plurality of original images; and
    analyzing the at least one extracted original image.

7. The method of claim 1, wherein the analyzing of the plurality of original images comprises:
    determining at least one parameter value from among a face region, a facial expression, a size of a mobile object, a location of the mobile object, a movement of the mobile object, information associated with whether objects included in the plurality of original images overlap, and a correlation of the plurality of original images.

8. The method of claim 7, wherein the providing of the recommended image processing mode comprises:
    determining the image processing mode that is to be recommended, based on at least one determined parameter value.

9. The method of claim 8, wherein the providing of the recommended image processing mode comprises:
    deleting at least one of the original images, based on the determination.

10. The method of claim 8, further comprising:
    generating each image corresponding to the image processing mode that is recommended, by combining the plurality of original images; and
    providing each generated image.

11. The method of claim 7, further comprising:
    generating encoding data obtained by encoding the plurality of original images; and
    generating a multi-image container including at least one piece of information associated with the encoding data and the at least one parameter value.

12. An apparatus for image processing, the apparatus comprising:
    an image sensor configured to provide a plurality of original images;
    a processor configured to:
        detect parameter values related to at least one image processing mode from each of the plurality of original images by analyzing the plurality of original images,
        apply the parameter values to a plurality of image processing modes,
        determine the at least one image processing mode which has a degree of completeness higher than a threshold value among the plurality of image processing modes using a value of each of the plurality of image processing modes to which the parameter values are applied,
        determine a recommended image processing mode based on the degree of completeness, and
        provide the recommended image processing mode, based on comparing the value of each of the plurality of image processing modes to which the parameter values are applied and the threshold value; and
    a memory configured to store at least one of the plurality of original images and encoding data obtained by encoding the plurality of original images.

13. The apparatus of claim 12, wherein the processor comprises:
    a scaler configured to:
        downsize at least one original image from among the plurality of original images, and
        provide at least one downsized image; and
    a pre-processor configured to:
        analyze the at least one downsized image, and
        provide information for recommending an image processing mode based on an analyzed result.

14. The apparatus of claim 12, wherein the processor comprises:

an original image extractor configured to extract at least one of the plurality of original images, and
a pre-processor configured to:
  analyze the at least one extracted original image,
  pre-process a plurality of image processing modes based on at least a part of an analyzed result of the plurality of original images, and
  provide information for recommending the image processing mode based on the pre-processed result.

15. The apparatus of claim 13, wherein the processor comprises:
  an encoder configured to:
    generate encoding data by encoding the plurality of original images, and
    store the encoding data; and
  a multi-image data processor configured to generate and to store multi-image data including information associated with the plurality of original images and information associated with the encoding data.

16. The apparatus of claim 13, wherein the pre-processor is further configured to determine at least one parameter value from among a face region, a facial expression, a size of a mobile object, a location of the mobile object, a movement of the mobile object, information associated with whether objects included in the plurality of original images overlap, and a correlation of the plurality of original images.

17. The apparatus of claim 16, wherein the pre-processor is further configured to determine the image processing mode to be recommended, based on the at least one determined parameter value.

18. The apparatus of claim 17, wherein the pre-processor is further configured to delete at least one of the original images, based on the determination.

19. The apparatus of claim 17, further comprising:
  an encoder configured to:
    generate encoding data obtained by encoding the original images, and
    store the encoding data; and
  a multi-image data processor configured to generate and to store multi-image data including information associated with the plurality of original images, information associated with the encoding data, and at least one parameter value.

20. A non-transitory computer-readable storage medium storing instructions that, when executed, cause at least one processor to perform the method of claim 1.

* * * * *